US011923934B2

(12) United States Patent
Mo et al.

(10) Patent No.: US 11,923,934 B2
(45) Date of Patent: Mar. 5, 2024

(54) METHOD AND APPARATUS FOR SITE-SPECIFIC AND DYNAMIC BASE STATION BEAM CODEBOOK DESIGN

(71) Applicant: Samsung Electronics Co., Ltd., Suwon-si (KR)

(72) Inventors: Jianhua Mo, Allen, TX (US); Boon Loong Ng, Plano, TX (US); Vutha Va, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 201 days.

(21) Appl. No.: 17/381,007

(22) Filed: Jul. 20, 2021

(65) Prior Publication Data
US 2022/0038146 A1   Feb. 3, 2022

Related U.S. Application Data

(60) Provisional application No. 63/060,558, filed on Aug. 3, 2020.

(51) Int. Cl.
*H04B 7/0456* (2017.01)
*H04B 7/06* (2006.01)
*H04W 24/06* (2009.01)

(52) U.S. Cl.
CPC ......... *H04B 7/0482* (2013.01); *H04B 7/0617* (2013.01); *H04W 24/06* (2013.01)

(58) Field of Classification Search
None
See application file for complete search history.

(56) References Cited

U.S. PATENT DOCUMENTS

| | | | |
|---|---|---|---|
| 10,340,996 B1 * | 7/2019 | Wakid | H04B 7/0639 |
| 10,356,789 B2 | 7/2019 | Raghavan et al. | |
| 10,608,711 B2 | 3/2020 | Nam et al. | |
| 10,615,855 B2 | 4/2020 | Gao | |

(Continued)

FOREIGN PATENT DOCUMENTS

| | | | | |
|---|---|---|---|---|
| CN | 110971279 A | * | 4/2020 | G06N 3/0454 |
| CN | 109474314 B | | 2/2021 | |

(Continued)

OTHER PUBLICATIONS

International Search Report dated Oct. 29, 2021 in connection with International Patent Application No. PCT/KR2021/010174, 3 pages.

(Continued)

*Primary Examiner* — Noel R Beharry
*Assistant Examiner* — Angelie T Ngo

(57) ABSTRACT

A base station (BS) can include a site-specific and dynamic codebook design. The BS includes an antenna and a transceiver coupled to the antenna and configured to communicate via a wireless communication medium. The BS also includes a processor coupled to the transceiver. The processor is configured to: receive, from a user equipment (UE), a measurement report comprising a best beam index and a corresponding received power; estimate a UE channel including a path gain and angle of departure; update the site-specific codebook based on the estimated UE channel; and transmit control and data signals to the UE using the updated site-specific codebook.

18 Claims, 15 Drawing Sheets

(56) References Cited

U.S. PATENT DOCUMENTS

| | | | |
|---|---|---|---|
| 10,763,944 B2 | 9/2020 | Zhang et al. | |
| 2019/0059129 A1* | 2/2019 | Luo | H04B 7/0695 |
| 2019/0123864 A1* | 4/2019 | Zhang | H04L 5/005 |
| 2019/0349045 A1* | 11/2019 | Varatharaajan | H04B 7/0469 |
| 2019/0387463 A1 | 12/2019 | Raghavan et al. | |
| 2020/0007203 A1 | 1/2020 | Zhou et al. | |
| 2020/0007216 A1 | 1/2020 | Nasiri Khormuji et al. | |
| 2020/0015106 A1 | 1/2020 | Lane et al. | |
| 2020/0128459 A1* | 4/2020 | Engström | H04W 36/10 |
| 2021/0013954 A1* | 1/2021 | Zhao | H04L 5/005 |
| 2021/0037390 A1* | 2/2021 | Tofighbakhsh | H04L 5/0044 |
| 2021/0314039 A1* | 10/2021 | Khalid | H04W 64/003 |
| 2023/0291442 A1* | 9/2023 | Davoli | H04B 7/0628 |
| | | | 375/224 |

FOREIGN PATENT DOCUMENTS

| | | | |
|---|---|---|---|
| KR | 10-2109772 B1 | 5/2020 | |
| KR | 10-2138813 B1 | 7/2020 | |
| WO | 2019/174743 A1 | 9/2019 | |
| WO | 2020/108777 A1 | 6/2020 | |

OTHER PUBLICATIONS

Written Opinion of the International Searching Authority dated Oct. 29, 2021 in connection with International Patent Application No. PCT/KR2021/010174, 5 pages.

* cited by examiner

METHOD AND APPARATUS FOR SITE-SPECIFIC AND DYNAMIC BASE STATION BEAM CODEBOOK DESIGN

CROSS-REFERENCE TO RELATED APPLICATIONS AND CLAIM OF PRIORITY

The present application claims priority to U.S. Provisional Patent Application No. 63/060,558 filed on Aug. 3, 2020. The content of the above-identified patent documents is incorporated herein by reference.

TECHNICAL FIELD

The present disclosure relates to electronic devices and methods for base station beam codebook design, more particularly, to electronic devices and methods for site-specific and dynamic base station beam codebook design.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance.

To meet the demand for wireless data traffic having increased since deployment of 4G communication systems, and to enable various vertical applications, 5G communication systems have been developed and are currently being deployed. A basic philosophy of New Radio (NR) in $3^{rd}$ Generation Partnership Project (3GPP) is to support beam-specific operations for wireless communication between a gNode B (gNB) and a user equipment (UE). There are several components in the 5G (e.g., fifth generation) NR specification that can efficiently be operated in a beam-specific manner.

The 5G communication system is considered to be implemented to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support. Aspects of the present disclosure may be applied to deployment of 5G communication systems, 6G or even later releases which may use THz bands. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

Embodiments of the present disclosure provide methods and apparatuses for site-specific and dynamic base station beam codebook designs.

In one embodiment, an apparatus is provided. The apparatus includes an antenna and a transceiver coupled to the antenna and configured to communicate via a wireless communication medium. The apparatus also includes a processor coupled to the transceiver. The processor is configured to: receive, from a user equipment (UE), a measurement report comprising a best beam index and a corresponding received power; estimate a UE channel including a path gain and angle of departure; update a site-specific codebook based on the estimated UE channel; and transmit control and data signals to the UE using the updated site-specific codebook.

In yet another embodiment, a method is provided. The method includes receiving, from a user equipment (UE), a measurement report comprising a best beam index and a corresponding received power. The method also includes estimating a UE channel including a path gain and angle of departure. The method also includes updating a site-specific codebook based on the estimated UE channel. The method further includes transmitting control and data signals to the UE using the updated site-specific codebook.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
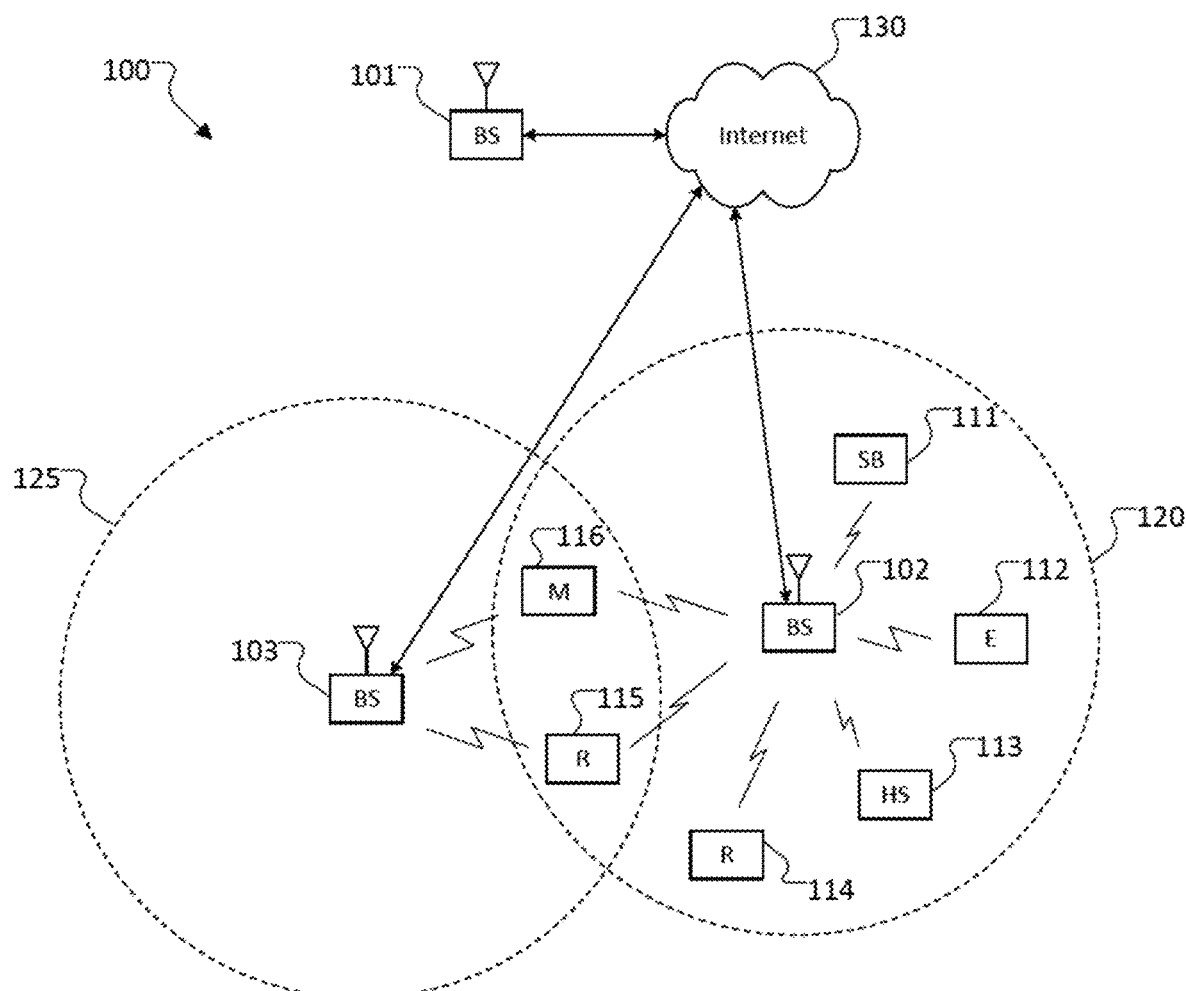
FIG. 1 illustrates an example wireless network according to embodiments of the present disclosure.

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: U.S. Ser. No. 10/735,066, Methods of beam codebook generation for the 5G terminal; and U.S. patent application Ser. No. 16/865,099 Design and adaptation of hierarchical codebooks.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both Frequency Division Duplexing (FDD) and Time Division Duplexing (TDD) are considered as the duplex method for both DL and UL signaling.

Although exemplary descriptions and embodiments to follow assume orthogonal frequency division multiplexing (OFDM) or orthogonal frequency division multiple access (OFDMA), this disclosure can be extended to other OFDM-based transmission waveforms or multiple access schemes such as filtered OFDM (F-OFDM).

The present disclosure covers several components which can be used in conjunction or in combination with one another or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying (FSK) and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
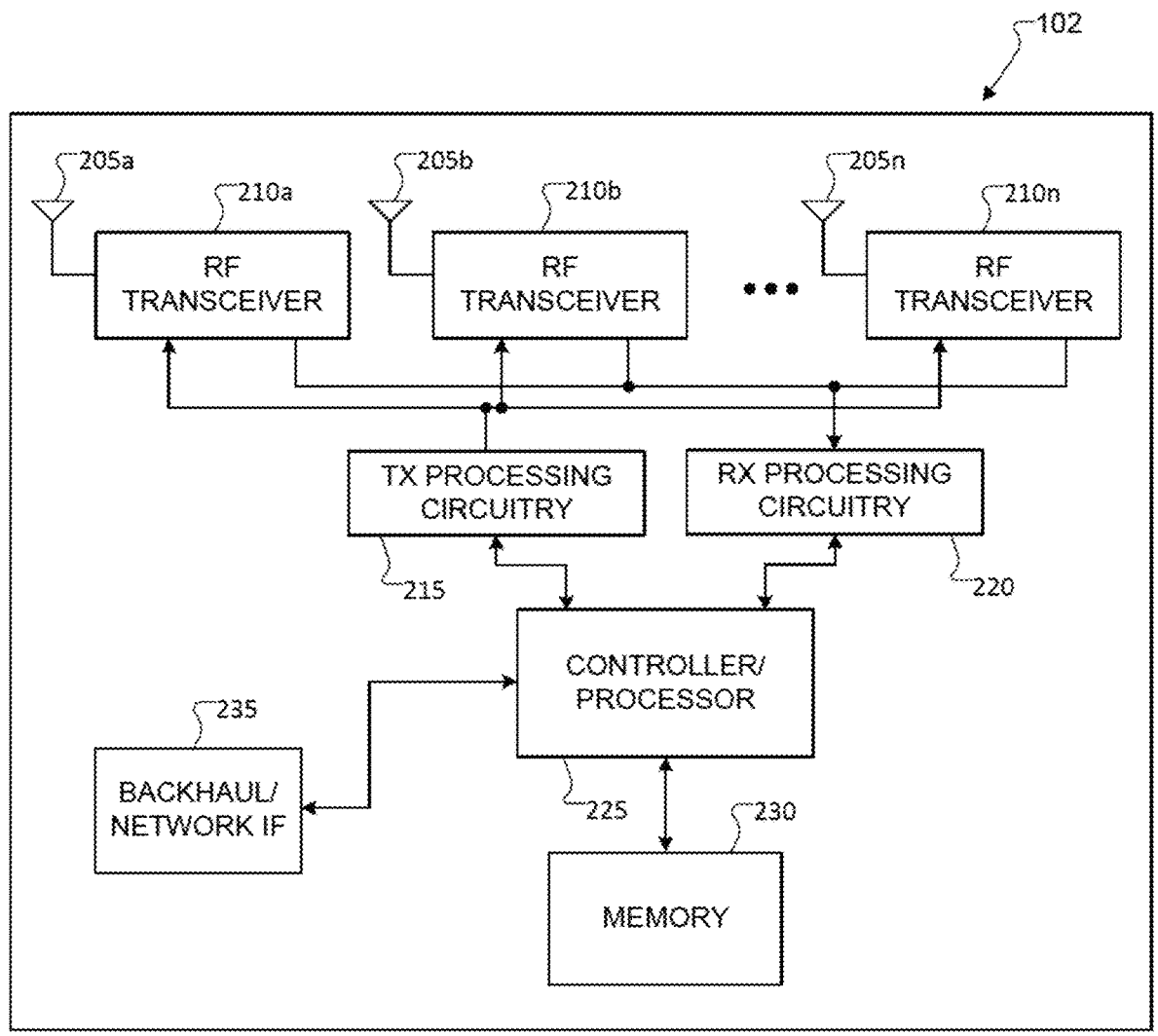
FIG. 2 illustrates an example gNB according to embodiments of the present disclosure.
Figure 3:
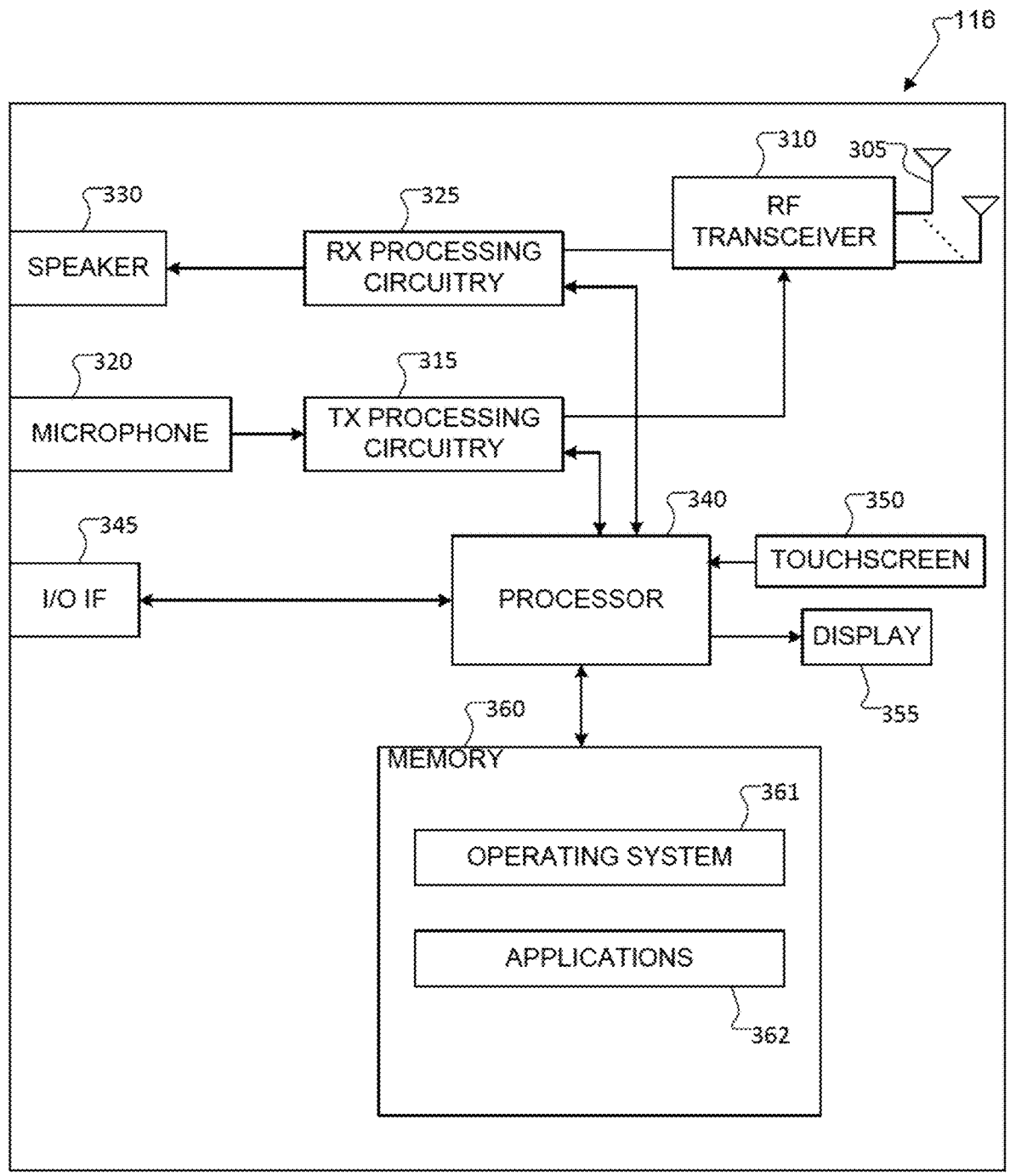
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include a two-dimensional (2D) antenna arrays as described in embodiments of the present disclosure. In some embodiments, one or more of gNB 101, gNB 102 and gNB 103 support the codebook design and structure for systems having 2D antenna arrays.

As described in more detail below, one or more of the UEs 111-116 include circuitry, programing, or a combination thereof, for measuring signal qualities of the one or more UL RSs and the one or more DL RSs for a time period and performing measurement reporting of the measured signal qualities. In certain embodiments, and one or more of the gNBs 101-103 includes circuitry, programing, or a combination thereof, to facilitate measurement reporting by the UE in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform a blind interference sensing (BIS) process, such as performed by a BIS algorithm, and decode the received signal subtracted by the interfering signals. Any of a wide variety of other functions can be supported in the gNB 102 by the controller/processor 225. In some embodiments, the controller/processor 225 includes at least one microprocessor or microcontroller In certain embodiments, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web RTC. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM. In certain embodiments, a plurality of instructions, such as a BIS algorithm is stored in memory 230. The plurality of instructions are configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support communication with aggregation of FDD cells and TDD cells.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350 (or key pad), a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for UL transmission on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
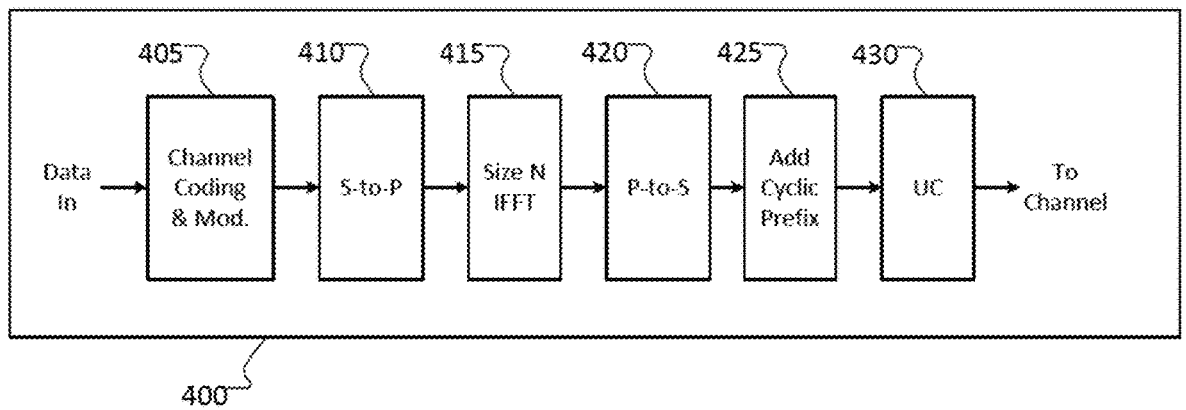
FIG. 4A illustrates a high-level diagram of an orthogonal frequency division multiple access transmit path according to embodiments of the present disclosure.
Figure 4B:
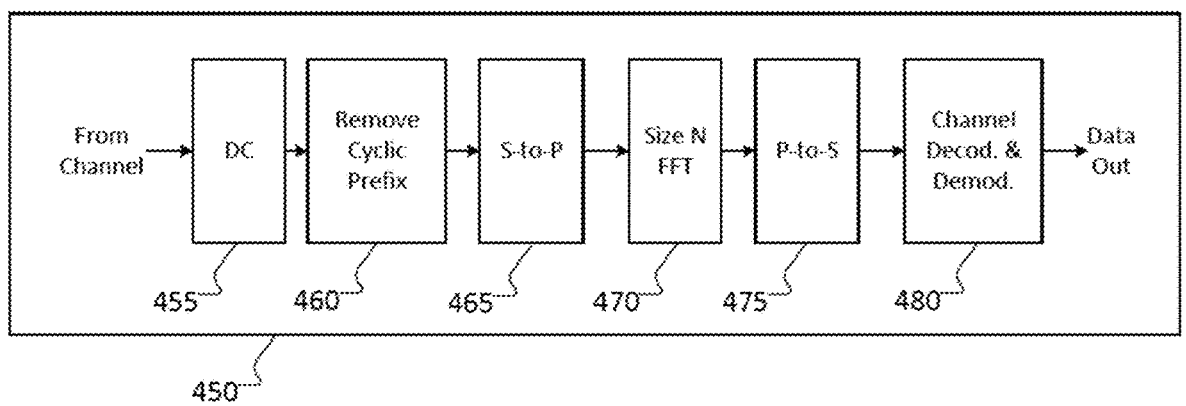
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement (ACK) information in response to data transport block (TB) transmission from a UE in a physical hybrid ARQ indicator channel (PHICH). An eNodeB transmits one or more of multiple types of RS including a UE-common RS (CRS), a channel state information (CSI)-RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH} = M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct, e.g., acknowledgement (ACK), or incorrect, e.g., negative acknowledgement (NACK), detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$ where $N_{SRS}=1$ if a last subframe symbol is used to transmit SRS and $N_{SRS}=0$ otherwise.

As operating frequency bands in NR become higher, the UE is evolving to accommodate a plurality of antenna panels to enhance aspects of multi-beam operation such as coverage enhancement, beam failure event minimization, fast beam switching, etc. Depending on hardware architectures, each panel on the UE 116 can perform multi-beam operation in a decoupled manner so that it is possible for the UE 116 to be capable of simultaneously DL/UL operations via multiple beam links, each of which corresponds to sufficiently reliable channels to independently communicate with gNB 102. The previous NR specification only allows multiple panels on UE 116 to be used for simultaneous DL reception or single panel selection for UL transmission in TDD operation.

Figure 5:
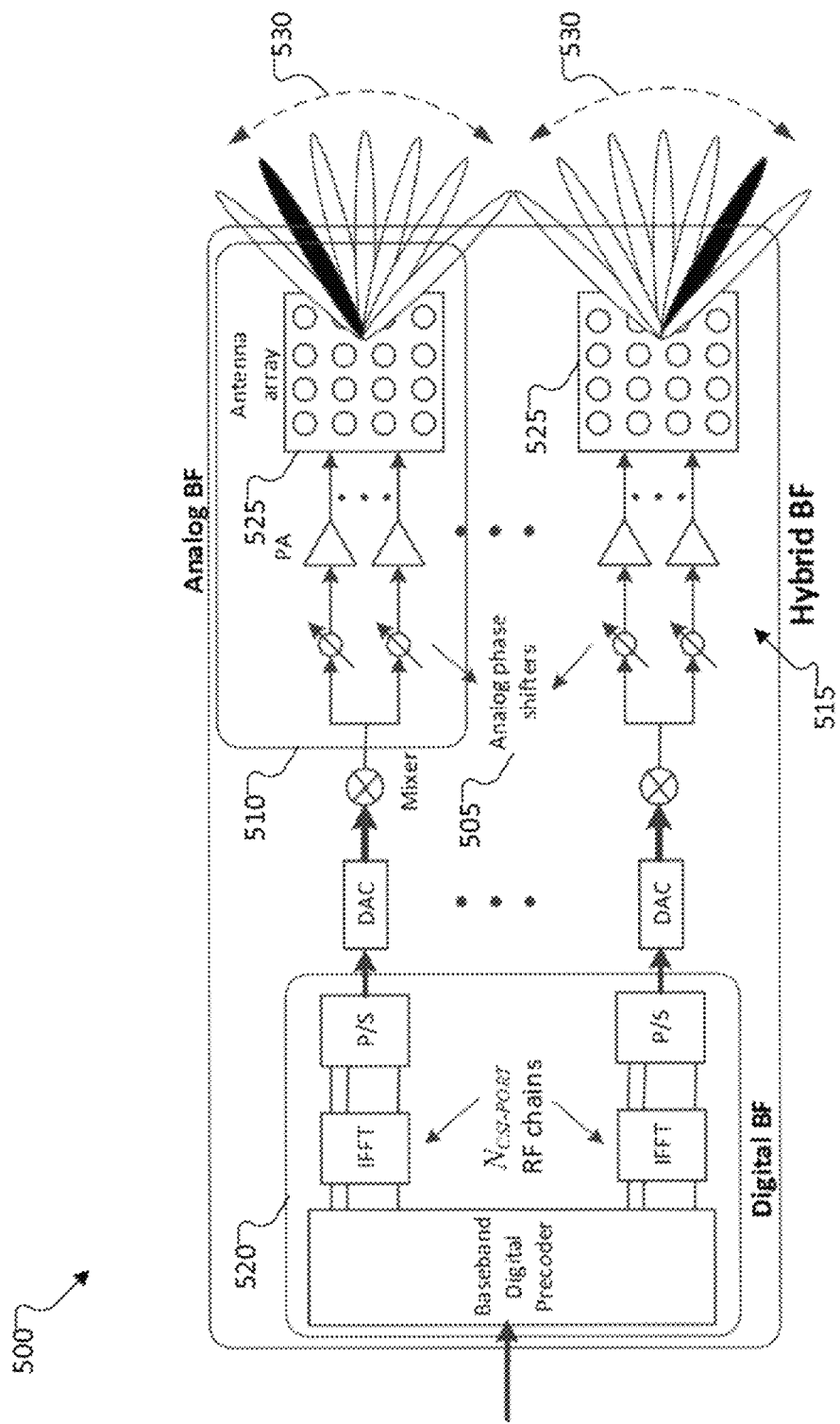
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports $N_{CSI\text{-}PORT}$. A digital BF 515 performs a linear combination across $N_{CSI\text{-}PORT}$ analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed FR4). In this case, the system can employ only analog beams. Due to the O2 absorption loss around 60 GHz frequency (~10 decibels (dB) additional loss @ 100m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE can be configured with a list of up to M transmission configuration indicator (TCI)-State configurations within the higher layer parameter PDSCH-Config to receive PDSCH in a serving cell where M depends on the UE capability maxNumberConfiguredTCIstatesPerCC. Each TCI-State contains parameters for configuring a QCL relationship between one or two downlink reference signals and the DMRS ports of the PDSCH, the DMRS port of a corresponding PDCCH, or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to N, such as N=8, TCI states to the codepoints of the DCI field 'Transmission Configuration Indication'. When the HARQ-ACK information corresponding to the PDSCH carrying the MAC-CE activation command is transmitted in slot n, the indicated mapping between TCI states and codepoints of the DCI field 'Transmission Configuration Indication' should be applied after a MAC-CE application time, e.g., starting from the first slot that is after slot n+ $3N_{slot}^{subframe,\mu}$ where $N_{slot}^{subframe,\mu}$ is a number of slot per subframe for subcarrier spacing (SCS) configuration $\mu$.

As operating frequency bands in NR become higher, the UE is evolving to accommodate a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize. For example, in 3GPP 5G NR Rel-17, new features to facilitate UL beam/panel selection for UEs equipped with multiple panels is being identified and specified under a unified transmission configuration indicator (TCI) framework, in order to mitigate UL coverage loss from several aspects such as maximum permissible exposure (MPE) issues on UE 116.

For example, a beam corresponds to a spatial transmission/reception filter that is used by the UE 116 and/or gNB 102. In one example, a beam can correspond to a spatial reception filter that is used by the UE 116 to receive a reference signal, such as an synchronization signals (SS) and physical broadcast channel (PBCH) (SS/PBCH block (SSB)) and/or a CSI-RS and so on. In another example, a beam can correspond to a spatial transmission filter that is used by the UE 116 to transmit a reference signal, such as an UL sounding reference signal (SRS) and so on.

A beam training and measurement procedure can include, for example, a procedure wherein the gNB 102 configures the UE 116 with a set of reference signal (RS) resources, such as SSB resources and/or CSI-RS resources, as well as a configuration for report settings, such that the UE can report beam quality metric(s) measurement(s), such as Reference Signal Received Power (RSRP), Reference Signal Received Quality (RSRQ), Received Signal Strength Indicator (RSSI), Signal to Noise Ratio (SNR), Signal to Interference and Noise Ratio (SINR), and so on, each of which can be, e.g., a L-1 measurement or a filtered L-3 measurement. In one example, a UE 116 and/or a gNB 102 can transmit a reference signal (RS), such as a Synchronization Signal Block (SSB) or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as L1/L3 RSRP or SINR. In one example, a selection of different spatial reception filters and/or quality metric and/or selection procedure can be per UE/gNB implementation.

A beam indication procedure can include, for example, a procedure wherein the gNB 102 can indicate to the UE 116 to transmit an uplink channel (and/or a second uplink signal) with a same spatial filter that was used to receive a (first) reference signal. In another example, the gNB 102 can indicate to the UE 116 to receive a downlink channel (and/or a second downlink signal) with a same spatial filter that was used to receive a (first) reference signal. Such indication can be, e.g., a DCI and/or MAC-CE, and/or radio resource control (RRC) signaling.

In one example, an antenna panel or, simply a panel, can refer to an antenna array 525 or an antenna sub-array connected to one or multiple RF chains. In one example, a panel can be referred to as a transmission-reception entity (TRE), which can virtualize multiple physical panels into a single virtual panel, based on a transparent UE/gNB implementation, such as MIMO diversity scheme(s).

A millimeter-wave (mmWave) beam codebook design is very important and challenging for the 5G mmWave base stations. Different from the low frequency bands, the mmWave antenna is inherently directional and mmWave signal can be very sensitive to blockage, reflection, etc. Certain codebook designs are constructed in the angular domain where the codebook is supposed to cover a certain angular domain. For example, 120° horizontal scan range (for example, −60°≤ϕ≤60°), and 60° vertical scan range (for example, 70°≤θ≤130°). It is noted that angular domain designed ignore a few important factors in real deployment. In certain angular designs, a path-loss difference is ignored. For example, when UEs are distributed on the ground, a θ=95° (i.e., cell-edge) region has much weaker channel gain compared to the region θ≥120° (i.e., cell-center). In certain angular designs, blockage is not considered. For example, the mmWave cannot penetrate the obstacle well; therefore, a beam shooting towards a building is not able to serve the UE behind the building. Additionally, certain angular designs ignore the reflection and multi-path, which can be utilized to serve the non-line-of-sight (nLoS) UEs.

Certain Embodiments in this disclosure provide methods to generate a beam codebook for base station. Certain Embodiments obtain input information including the antenna element radiation pattern, antenna spacing and antenna size, and UE channel information to generate a site-specific and dynamic codebook design. Although mmWave bands are used as example in this disclosure, the embodiments in this disclosure can also be applied to other frequency bands as well. The site-specific codebook design corresponds to a codebook designed for one or more localize attributes or environmental conditions for a particular base station utilizing the site-specific codebook. That is, the site-specific codebook is uniquely designed for use by a particular base station.

In certain embodiments, a site-specific BS beam codebook is designed based on a ray tracing data and by an iterative algorithm. Ray tracing simulation tool, for instance, Wireless InSite, can simulate multiple rays (up to 250 rays) for each transmitter-receiver pair. Assume that the strongest L rays are generated, the data extracted from ray tracing simulation tool is as follows:
1. $P\_(k,1)$: ray gain
2. $\theta\_(k,1)$: Elevation angle of departure from BS,
3. $\phi\_(k,1)$: Azimuth angle of departure from BS,
where $1$ ($1 \leq 1 \leq L$) represents the $1^{th}$ strongest path and $k(1 \leq k \leq K)$ stands for the index of UE.

Figure 6:
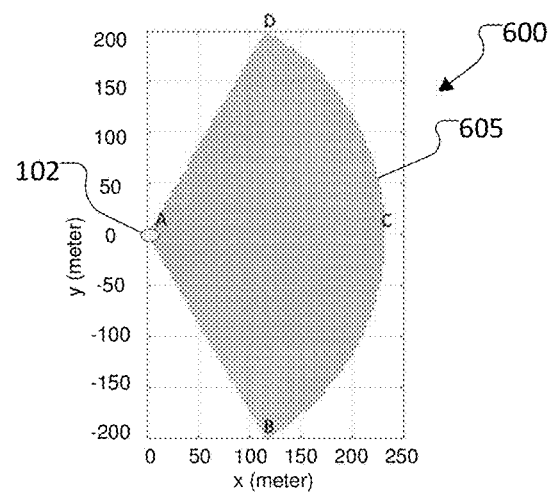
FIG. 6 illustrates an example uniform distribution of a base station signal according to embodiments of the present disclosure.

FIG. 6 illustrates an example uniform distribution of a base station signal according to embodiments of the present disclosure. The embodiment of the uniform distribution 600 shown in FIG. 6 is for illustration only. Other embodiments could be used without departing from the scope of the present disclosure.

In the example shown in FIG. 6, each dot represents a UE. Note that the UE distribution is not limited to be 2D or uniform. The 3D and non-uniform UE distribution might be obtained through the historical knowledge of the UE locations. In an ideal situation, a signal from a base station, such as gNB 102, is distributed evenly throughout a cell 605 coverage area as defined by point A, at gNB 102, and points B, C, and D. Without any obstruction or interference, a UE, such as UE 116, receives an equal signal regardless of where the UE 116 is located within the cell 605.

Figure 7A:
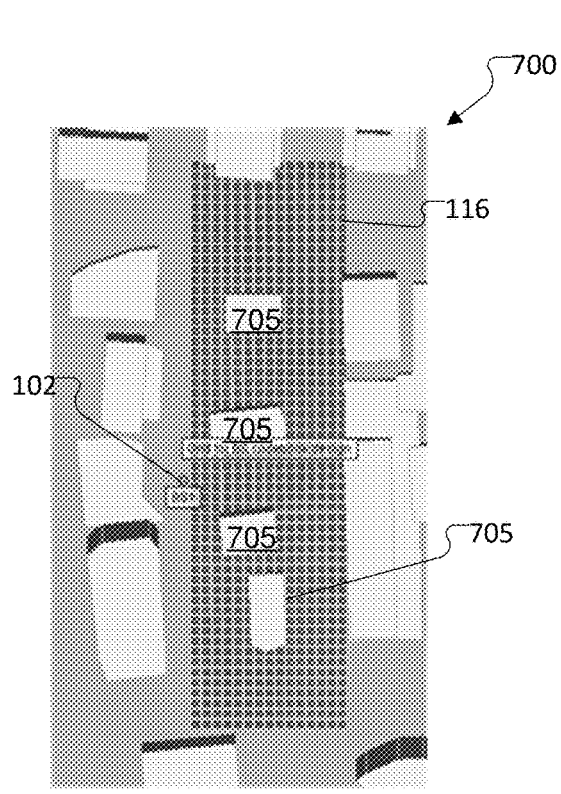
FIGS. 7A and 7B illustrate example terminal and signal distribution in an obstructed area according to embodiments of the present disclosure.
Figure 7B:
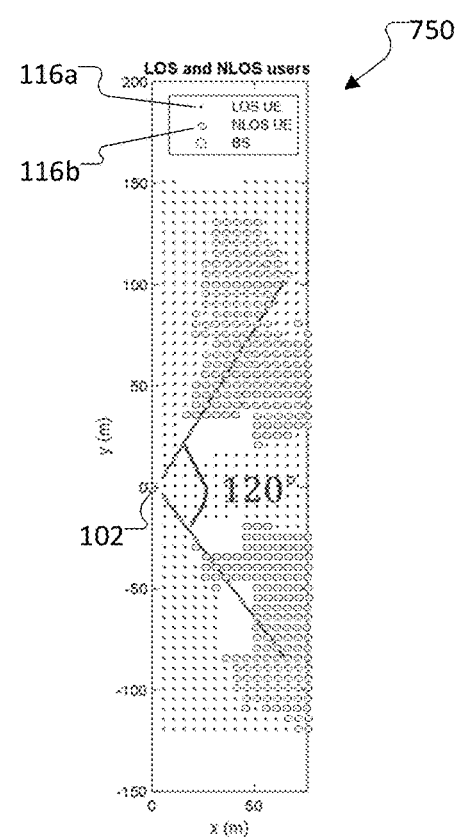

FIGS. 7A and 7B illustrate example terminal and signal distribution in an obstructed area according to embodiments of the present disclosure. The embodiment of the distributions 700 and 750 shown in FIGS. 7A and 7B are for illustration only. Other embodiments could be used without departing from the scope of the present disclosure.

In the example shown in FIG. 7A, each dot represents a UE and the UEs are uniformly distributed on a square grid. Note that the UE distribution is not limited to be 2D or uniform. The 3D and non-uniform UE distribution might be obtained through the historical knowledge of the UE locations. The gNB 102 may transmit using a non-site-specific codebook design. In the example, the signal may be obstructed by one or more buildings 705 or objects. Therefore, the UE's are divided into those that have a line-of-sight (LoS), namely LoS UE 116a, and those that have nLoS, namely nLoS UE 116b. As gNB 102 transmits signals to the UEs, the LoS UE 116a receive the signal while the nLoS UE 116b may not receive the signal due to the buildings 705, In certain embodiments, the optimization metric of the beam codebook design is the coupling gain, denoted by $\Gamma_k$ defined as the ratio between the power received by the UE k and the power transmitted by BS. The UE can be isotropic or directional. In the example design, the UE is assumed to be an isotropic UE for simplicity. Therefore, the coupling gain of UE is computed based on the ray-tracing data and BS beam gain as:

$$\Gamma_k = \max_{\{1 \leq n \leq N\}} \sum_{\ell=1}^{L} P_{k,\ell} G_n(\theta_{k,\ell}, \phi_{k,\ell}) \quad (1)$$

where $G_n(\theta,\phi)$ is the beamforming gain of beam n at the direction $(\theta,\phi)$, and N is the codebook size. As seen in Equation 1, the coupling gain depends on the channel and the BS beamforming.

By organizing the E-field response data of antenna element in a matrix M, the beamforming gain of beam $w_n$ is written as:

$$G_n(\theta_{k,\ell}, \phi_{k,\ell}) = w_n^* M(\theta_{k,\ell}, \phi_{k,\ell}) w_n \quad (2)$$

Therefore, the coupling gain between $n^{th}$ beam and $k^{th}$ UE is, $$\gamma_{k,n} = \max_{\{1 \leq n \leq N\}} w_n^* \left( \sum_{\ell=1}^{L} P_{k,\ell} M(\theta_{k,\ell}, \phi_{k,\ell}) \right) w_n \quad (3)$$

The codebook $\{w_n, 1 \leq n \leq N\}$ is designed to maximize the mean coupling gain.

$$\frac{1}{K} \sum_{k=1}^{K} \max_{\{1 \leq n \leq N\}} \gamma_{k,n} \quad (4)$$

More generally, the codebook can be designed to maximize an objective function, $$\frac{1}{K} \sum_{k=1}^{K} f\left( \max_{\{1 \leq n \leq N\}} \gamma_{k,n} \right) = \frac{1}{K} \sum_{k=1}^{K} f(\Gamma_k) \quad (5)$$

where $f(\cdot)$ is a utility function of the gain. An example of utility function is $f(x)=\log(x)$ where the average coupling gain (in dB scale) is maximized.

In one example, the UE received power can be used as an optimization metric. The design procedure is similar to the case of coupling gain. Following the definitions given above, the received power by UE k is:

$$k = P_{BS} \Gamma_k \quad (6)$$

where $P_{BS}$ is the BS power, and $\Gamma_k$ is the coupling gain between the BS and UE k.

In another example, the UE throughput can also be used as the optimization metric. The design procedure is similar to the case of coupling gain. Following the definitions given above, the DL throughput of UE k is:

$$k = BW * \log_2\left(1 + \frac{P_{BS} \Gamma_k}{P_{noise}}\right) \quad (7)$$

where $P_{BS}$ is the BS power, $P_{noise}$ is the noise power at the UE, BW is the bandwidth, and $\Gamma_k$ is the coupling gain between the BS and UE k. Other ways of translating the SNR/SINR to throughput can also be used, such as SINR-to-throughput mapping measured in the lab or in the field, or other equations that consider the system resource overhead (e.g., control channel and RS (reference signal) overhead) and the supported modulation and coding schemes.

Figure 8:
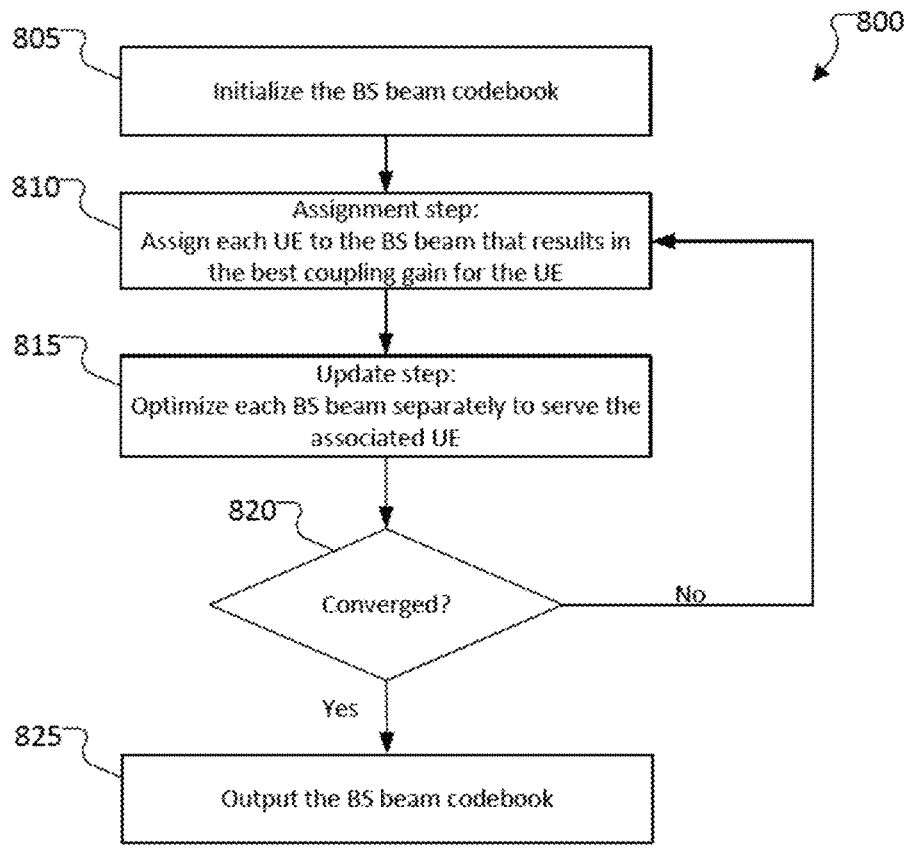
FIG. 8 illustrates a codebook design process according to embodiments of the present disclosure.

FIG. 8 illustrates a codebook design process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 800 can be accomplished by, for example, gNB 102 and gNB 103 in network 100.

In operation 805, the base station beam codebook is initialized. The initial beam codebook could be DFT codebook, or initialized by a greedy algorithm, such as in U.S. Pat. No. 10,735,066. If the optimization metric is the coupling gain, the set of UEs assigned to Beam m in operation 810 is:

$$S_m = \left\{ k \mid m = \operatorname*{argmax}_{1 \leq n \leq N} \gamma_{k,n} \right\} \quad (8)$$

In operation 815, each beam is can be updated separately to maximize the sum coupling gain of the UEs that are assigned to it as:

$$w_n^* \left( \sum_{k \in S_n} \sum_{\ell=1}^{L} P_{k,\ell} M(\theta_{k,\ell}, \phi_{k,\ell}) \right) w_n \quad (9)$$

Then, the method given in U.S. Pat. No. 10,735,066 can be adopted to design $w_n$. The optimization process is repeated for all the beams, $1 \leq n \leq N$. In operation 820, a determination is made regarding whether convergence has occurred. If convergence has not occurred, the process returns to operation 810. That is, the assignment in operation 810 and update in operation 815 are updated iteratively until convergence; for example, the wide beams do not change, or the assignment of UE sets of the wide beams do not change any more. The optimization metric in the assignment in operation 810 could be the coupling gain, the received power, or the throughput, and the like. Thereafter, the BS beam codebook is output in operation 825.

In certain embodiments, the data extracted from a ray tracing simulation tool is as follows.

1. $P_{k,\ell}$: ray gain,
2. $\theta_{k,\ell}$: Elevation angle of departure from BS,
3. $\phi_{k,\ell}$: Azimuth angle of departure from BS,
4. $\tau_{k,\ell}$: the time of arrival, where $\ell$ ($1 \leq \ell \leq L$) represents the $\ell^{th}$ strongest path and k ($1 \leq k \leq K$) stands for the index of UE. Compared to the above method, another data, i.e., the time of arrival of each ray, is extracted. Then BS can construct the channel. For example, the equivalent lowpass channel can be written as follows.

$$h_k(\tau) = \sum_\ell P_{k,\ell} v(\theta_{k,\ell}, \phi_{k,\ell}) \exp(-j 2\pi f_c \tau_{k,\ell}) \delta(\tau - \tau_{k,\ell}) \quad (9)$$

where $v(\theta_{k,\ell}, \phi_{k,\ell})$ is the steering vector of BS at the direction ($\theta_{k,\ell}, \phi_{k,\ell}$), $f_c$ is the carrier frequency, and $\delta(\cdot)$ is the Dirac delta function. Then the coupling gain can be computed from the beamforming vector of BS and the equivalent lowpass channel.

Figure 9:
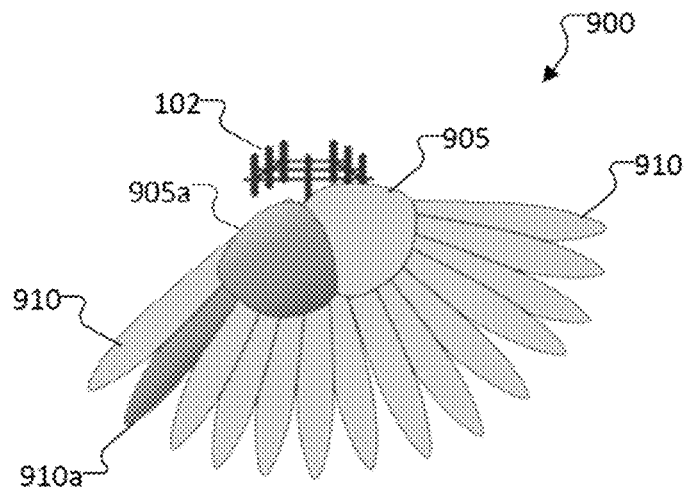
FIG. 9 illustrates a base station with two wideband beams and fourteen narrowband beams according to embodiments of the present disclosure.

FIG. 9 illustrates a base station with two wideband beams and fourteen narrowband beams according to embodiments of the present disclosure. The embodiment of the base station beams 900 shown in FIG. 9 is for illustration only. Other embodiments could be used without departing from the scope of the present disclosure.

In the example shown in FIG. 9, gNB 102 is configured with two wideband (WB) beams 905 and fourteen narrowband (NB) beams 910. In certain embodiments, the generation of a hierarchical codebook is site-specific. There could be several approaches of generating the site-specific hierarchical codebook, depending on whether the wide beam codebook, the narrow beam codebook, or both, are site-specific.

In certain embodiments, the entire hierarchical codebook, including the beams at every tier, is site-specific. The upper-tier wide beams and lower-tier narrow beams are generated base on the ray-tracing data of the cell.

Figure 10:
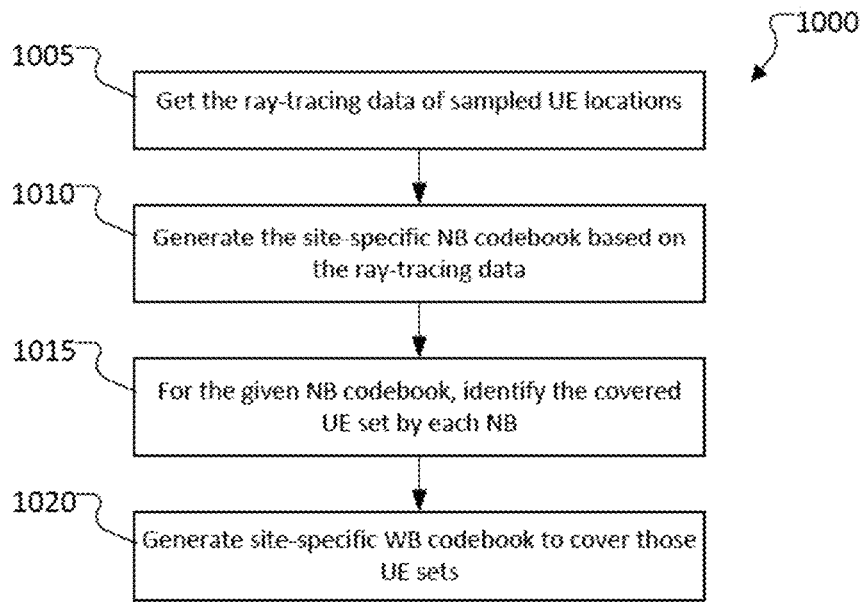
FIG. 10 illustrates a site-specific NB and WB codebook design process according to embodiments of the present disclosure.

FIG. 10 illustrates a site-specific NB and WB codebook design process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1000 can be accomplished by, for example, gNB 102 and gNB 103 in network 100.

The first and the second operations in FIG. 10 can be performed according to the process 800 for site-specific single tier codebook design. That is, in operation 1005, the base station beam codebook is initialized. The initial beam codebook could be DFT codebook or initialized by a greedy algorithm. If the optimization metric is the coupling gain, the set of UEs assigned to Beam m in operation 1010 is according to Equation 8 above.

In operation 1015, the set of UEs associated with each NB 910 can be identified by selecting the best NB 910a according to the UE received power or throughput according to the methods as described herein above. There is a total of $N_{NB}$ UE sets, where $N_{NB}$ is the total number of NBs in a cell, and this can be designed or determined according to the cell deployment requirements such as the cell coverage. $N_{NB}$ can also be determined in operation 1010.

In operation 1020, an iterative algorithm could be used to design the site-specific WB codebook. The procedure illustrated in FIG. 11.

Figure 11:
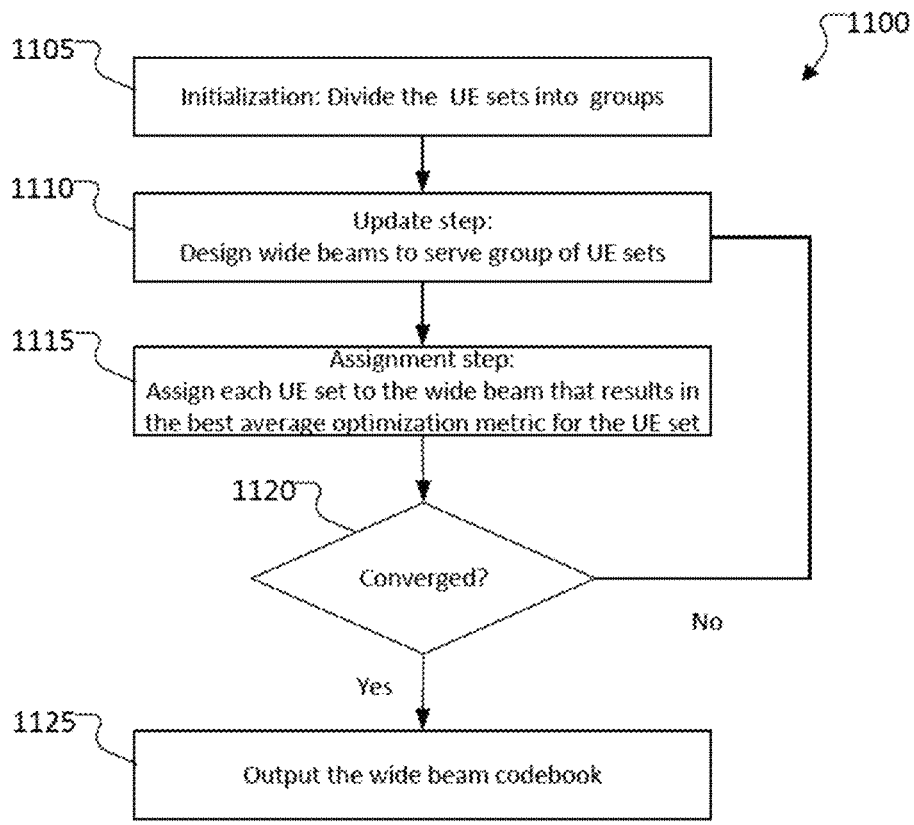
FIG. 11 illustrates a site-specific WB codebook design process according to embodiments of the present disclosure.

FIG. 11 illustrates a site-specific WB codebook design process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1100 can be accomplished by, for example, gNB 102 and gNB 103 in network 100.

In operation 1105, during initialization, the $N_{NB}$ UE sets are divided into $N_{WB}$ groups. This division can be done randomly or follow certain patterns, for example, the UE sets that are close to each other spatially are grouped together;

In operation 1110, as part of an update step, $N_{WB}$ wide beams are designed to serve each group of UE sets. There are various methods for wide beam design, for example, deactivate some of the antennas, or subarray method, or superposition method, or utility-based search method in U.S. patent application Ser. No. 16/865,099.

In operation 1115, during an assignment step, the $N_{WB}$ groups of UE sets are re-assigned to $N_{WB}$ wide beams. This reassignment is done based on the average optimization metric of the UEs in the UE set. The UE set is assigned to the best wide beam 905a the provides the highest average optimization metric. For example, if the optimization metric is coupling gain, the UE sets assigned to n-th wide beam 905 are:

$$S'_n = \left\{ S_i \mid m = 1 \le \underset{1 \le n \le N_{WB}}{\operatorname{argmax}} \sum_{k \in S_i} \gamma'_{k,n} \right\} \quad (10)$$

where $S_i$ is the UE set covered by i-th narrow beam 910, and $\gamma'_{k,n}$ is the coupling gain of the UE k when served by $n^{th}$ narrow beam 910. The assignment may also take into account other metrics, for example, the throughput, the hierarchical search accuracy probability, and the like.

In operation 1120, a determination is made regarding whether convergence has occurred. If convergence has not occurred, the process returns to operation 1110. That is, operations 1010 and 1015 are repeated until convergence. For example, the wide beams do not change, or the assignment of UE sets of the wide beams do not change any more. If it is determined that convergence has occurred, the wide beam codebook is output in operation 1125.

Figure 12:
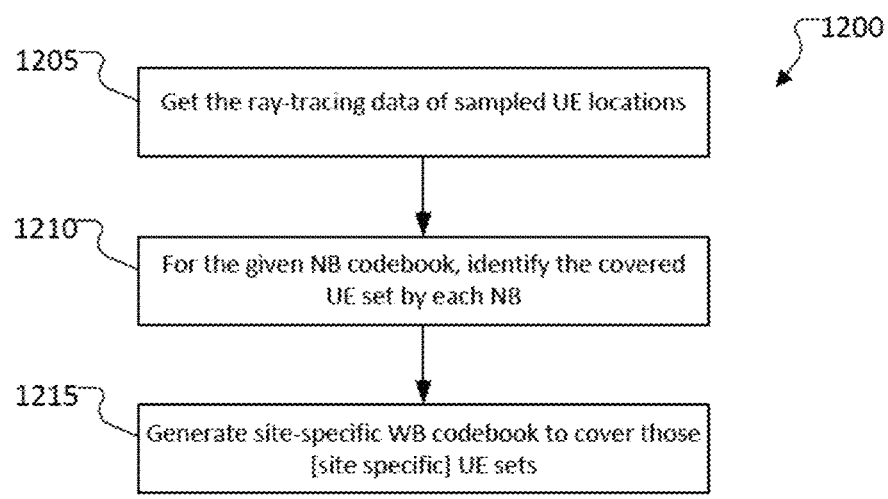
FIG. 12 illustrates a common NB and site-specific WB codebook design process according to embodiments of the present disclosure.

FIG. 12 illustrates a common NB and site-specific WB codebook design process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1200 can be accomplished by, for example, gNB 102 and gNB 103 in network 100.

In certain embodiments, the lower-tier narrow beams are the same across sites, but the upper-tier wide beams are site-specific. The WB codebook can be designed by following the process 1100 in FIG. 11.

In certain embodiments, the site-specific WB codebook design takes into account the typical UE mobility pattern. By examining the road/street/sidewalk in the cell, the NB changes as the UE moves along the road/street/sidewalk are identified. In certain embodiments, the NBs that are pointing to adjacent segment of the road/street/sidewalk may fall within the children set of the same WB, so that the number of WB switching can be minimized. A possible algorithm is to take into account the typical UE mobility pattern in the initialization operation 1105 in FIG. 11.

In operation 1205, ray tracing data is obtained. The ray tracing data can be of sampled UE locations. In operation 1210, for a given NB codebook, the covered UE set by each NB is identified. In operation 1215, a site-specific WB codebook is generated. The site-specific WB codebook is designed to cover the covered UE sets.

A UE mobility pattern can be defined by a sequence or group of best NB indices for the UE 116 over a time duration. It can also be defined by the geographical location change of the UE 116 over a time duration. In one approach, a UE is disposed, over time, at all possible locations within the cell and UE 116 performs random walk (movement) within the cell. The best NB sequence of the UEs, such as [NB1, NB2, NB2, NB5, NB5, NB5, NB2, ... ] is obtained, such as via one or more reports from UE 116. From these sequences, the mobility pattern of the UE 116 is obtained.

Figure 13:
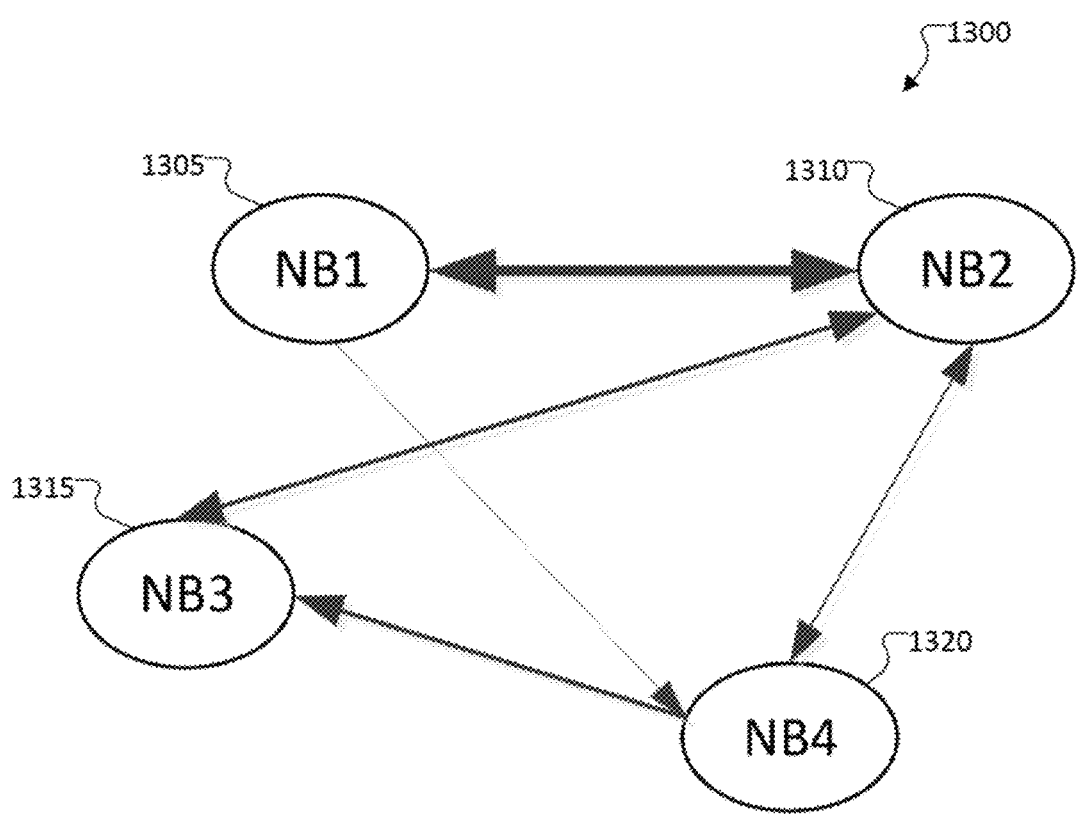
FIG. 13 illustrates a mobility pattern state diagram of NB beams according to embodiments of the present disclosure.

FIG. 13 illustrates a mobility pattern state diagram of NB beams according to embodiments of the present disclosure. The embodiment of the mobility pattern 1300 shown in FIG. 13 is for illustration only. Other embodiments could be used without departing from the scope of the present disclosure.

In the example shown in FIG. 13, the mobility pattern 1300 is modelled by a Markov chain. That is, given the UE is served by NB-X now, what is probability that the UE will be served by a beam in the next time step.

If the UE 116 moves from the coverage region of a first beam 1305 to a second beam 1310 with relatively high chance, there is an arrow pointing from the first beam (NB1) 1305 to the second beam (NB2) 1310. Most of the arrows are likely to be two-way, but one-way arrows are also possible, e.g., at the one-way road. The thickness of the line between states is used to represent the occurrence chance of the transition. The narrow beams, with high transition probabilities, could be assigned to a same parent wide beam, while the narrow beams, with zero or low transition probabilities, could be assigned to different wide beams. In this example, since there is no arrow between NB1 1305 and NB3 1315, and thick line between NB1 1305 and NB2 1310. Therefore, gNB 102 can choose to design a hierarchical codebook where NB1 1305 and NB2 1310 belongs to the same parent WB, and NB3 1315 and NB4 1320 belongs to another parent WB.

In certain embodiments, the mobility pattern 1300 can be learned by training a recurrent neural network (RNN), such as a Long Short-Term Memory (LSTM). Given the history records of the NB, the RNN models can predict the probability of the next best NB.

Figure 14:
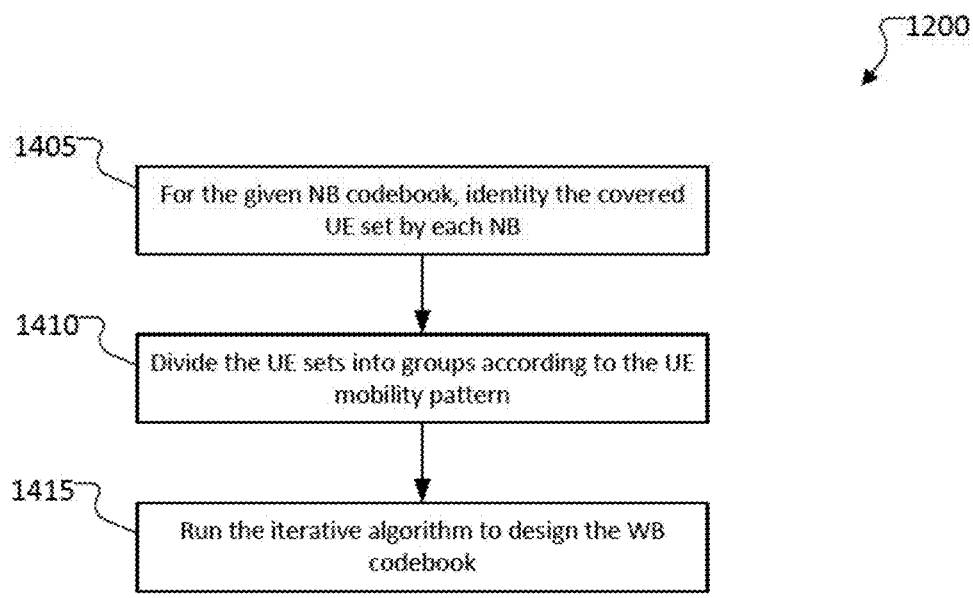
FIG. 14 illustrates a site-specific WB codebook, accounting for a UE mobility pattern, design process according to embodiments of the present disclosure.

FIG. 14 illustrates a site-specific WB codebook, accounting for a UE mobility pattern, design process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1400 can be accomplished by, for example, gNB 102 and gNB 103 in network 100.

In operation 1405, for a given NB codebook, the covered UE set for each NB is identified. In operation 1410, the UE sets are divided into groups according to the UE mobility pattern. The UEs with sufficiently high correlation of UE mobility patterns can be included in a same group, namely ah high mobility group. Then wide beams are designed to serve these high mobility groups. In operation 1415, an iteration is performed between the Assignment step, such as in operations 810 and 1115, and Update steps, such as in operations 815 and 1110, until convergence.

Figure 15A:
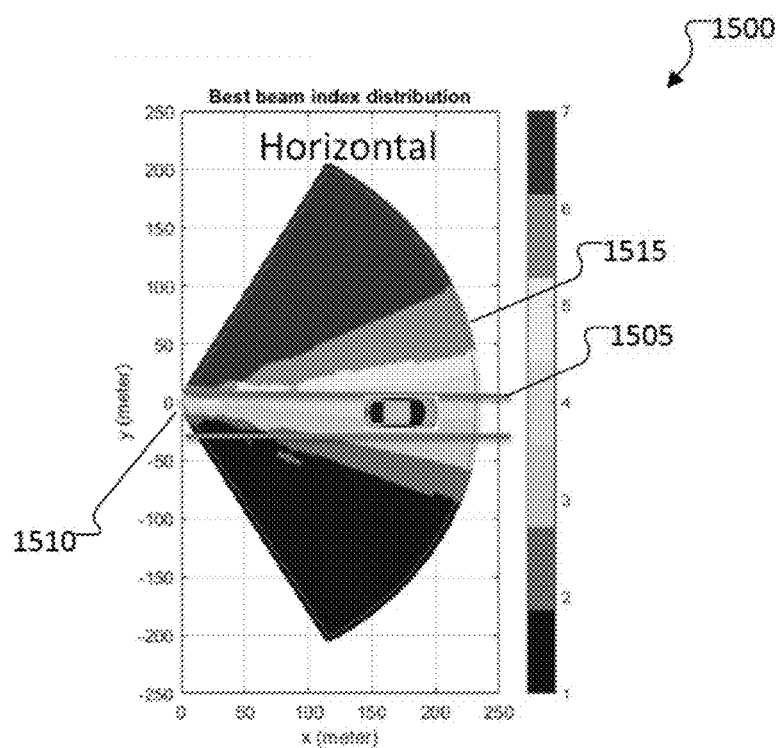
FIGS. 15A-15C illustrate horizontal, vertical, and two-dimensional distributed WB codebooks according to embodiments of the present disclosure.
Figure 15B:
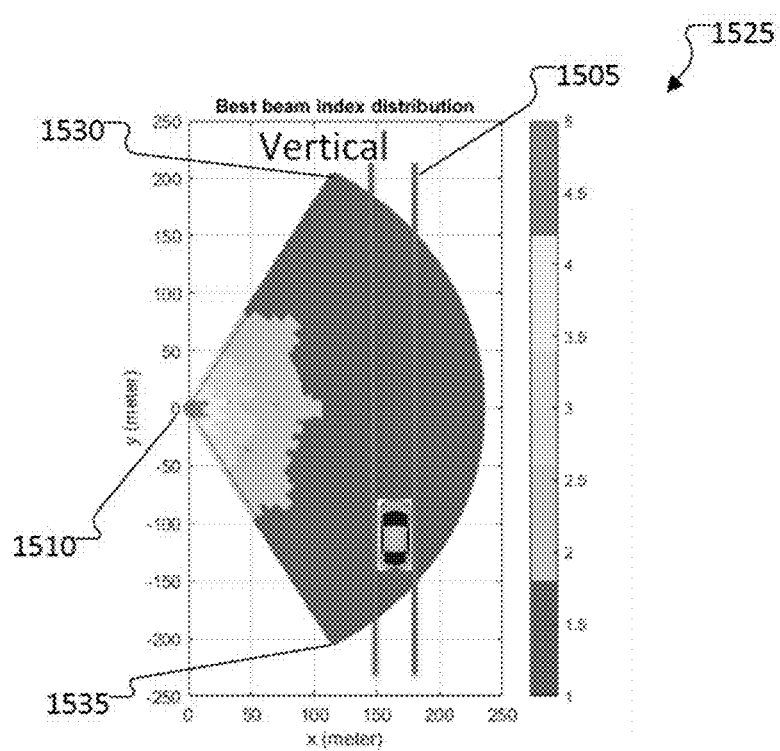
Figure 15C:
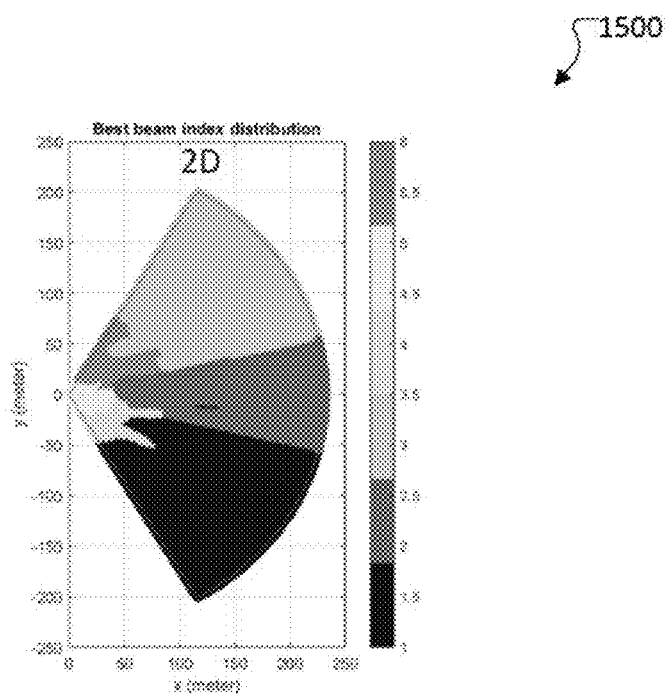

FIGS. 15A-15C illustrate horizontal, vertical, and two-dimensional distributed WB codebooks according to embodiments of the present disclosure. The embodiments of the codebooks 1500, 1525, and 1550 shown in FIGS. 15A-15C are for illustration only. Other embodiments could be used without departing from the scope of the present disclosure.

The three codebooks 1500, 1525, and 1550 are designed to account for different UE mobility patterns. The example shown in FIG. 15A depicts a horizontal WB codebook 1500 for a 'horizontal' case in which the street 1505 direction is from the cell-center 1510 to the cell-edge 1515, and the generated wide beams are distributed horizontally. Therefore, gNB 102 is able to reduce the WB switching when the UE 116 is moving on the street 1505. The example shown in FIG. 15B depicts a vertical WB codebook 1525 for a 'vertical' case in which the street 1505 direction is from the cell-edge 1530 to the cell-edge 1535, parallel to the cell-center 1510, and the generated wide beams are distributed vertically. That is, in the 'vertical' case, the wide beams are designed to serve the moving UEs 116 in a street parallel to the BS antenna array. Therefore, gNB 102 is able to reduce the WB switching when the UE 116 is moving on the street 1505. The example shown in FIG. 15C depicts a two-dimensional (2D) codebook 1550. For example, when there is no clear UE movement trajectory pattern, the WB distributed in '2D' can be utilized by gNB 102. In the 2D codebook 1550, the upper-tier wide beams are same across sites, but the lower-tier narrow beams (NB) are site-specific.

Figure 16:
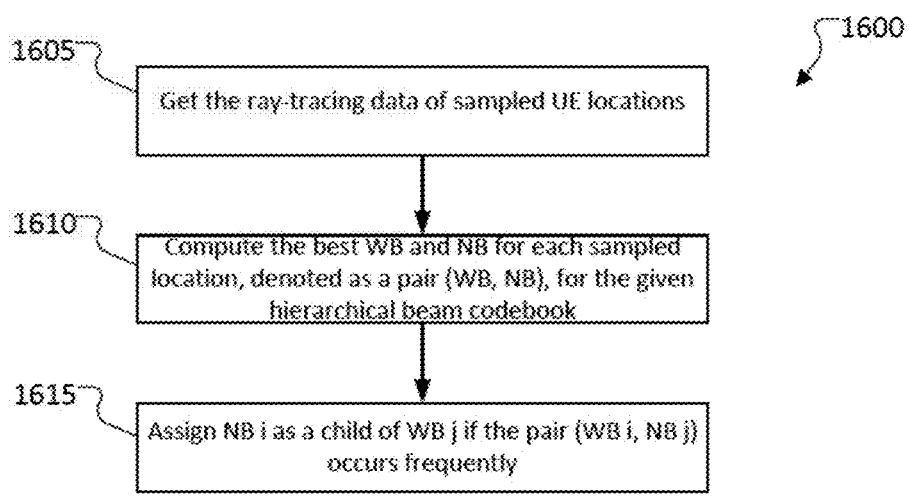
FIG. 16 illustrates a site-specific hierarchical design process according to embodiments of the present disclosure.

FIG. 16 illustrates a site-specific hierarchical design process according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1600 can be accomplished by, for example, gNB 102 and gNB 103 in network 100.

In certain embodiments, the hierarchical structure of the codebook could be site-specific. Based on the ray-tracing data obtained in operation 1605, the best WB and best NB are computed for each UE location in operation 1610. In operation 1615, the WB-NB pair for each location are recorded and then assigned a NB as the child of a WB if they are paired frequently, namely, paired a plurality of times. In certain embodiments, a NB can be a child of multiple WBs. The index of the best WB is calculated as follows:

$$n^*_{WB}(k) = \underset{\{1 \leq n \leq N_{WB}\}}{\mathrm{argmax}} \sum_{\ell=1}^{L} P_{k,\ell} G_n^{WB}(\theta_{k,\ell}, \phi_{k,\ell}) \quad (11)$$

where n*(k) is the best WB beam index of UE k, and $G_n^{WB}(\theta_{k,\ell}, \phi_{k,\ell})$ is the beam pattern of WB n, and $N_{WB}$ is the codebook size. Similarly, the index of the best NB is calculated as follows:

$$n^*_{NB}(k) = \underset{\{1 \leq n \leq N_{NB}\}}{\mathrm{argmax}} \sum_{\ell=1}^{L} P_{k,\ell} G_n^{NB}(\theta_{k,\ell}, \phi_{k,\ell}) \quad (12)$$

It is noted that many methods to decide whether a WB-NB pair occurs frequently can be used.

In the first method, the beam pairs are sorted according to the frequency in the descending order, and the pairs connected in the hierarchical structure from the highest frequency to lower frequency, until the cumulative frequency reaches certain percentile of the total frequency. Mathematically, the frequency of the pairs can be sorted as $N_1 \geq N_2 \geq N_3 \geq \ldots \geq N_T$. Then, the pairs are connected from first pair to $n^{th}$ pair where:

$$\frac{N_1 + N_2 + N_k}{N_1 + N_2 + \cdots + N_T} \geq x\% \quad (13)$$

The x % could be decided based on the latency requirement of the beam searching, the hierarchical searching accuracy requirement, and so forth.

In another method, for a given WB, such WB1, the narrow beams are sorted according to their pairing frequency with WB1 in the descending order, and then the first $$\frac{N_{NB}}{N_{WB}}$$

narrow beams are assigned as the children of WB1. The process is repeated for all the wide beams.

Besides only connecting the frequent beam pair of WB-NB, all the possible pairs found in the ray-tracing simulation can be associated. By this method of connecting all the existing pairs, there is a high chance of finding the best narrow beam, at the cost of searching more narrow beams.

Figure 17A:
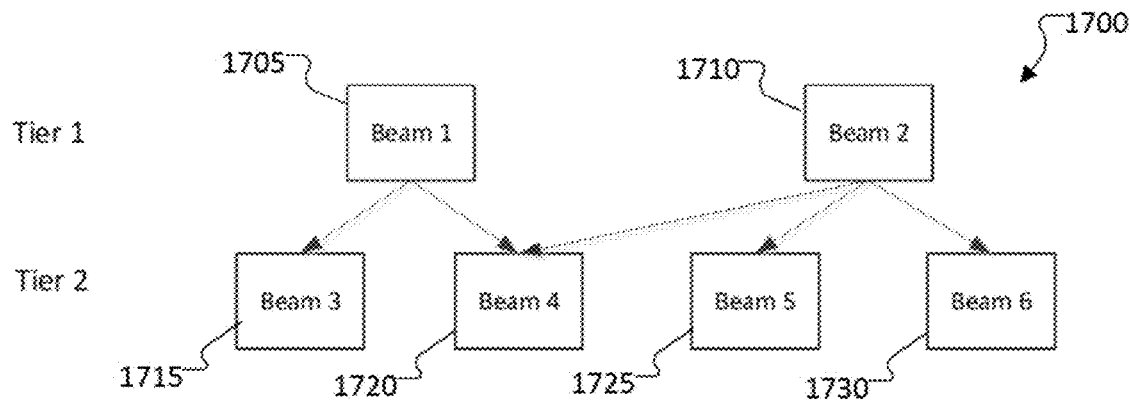
FIGS. 17A and 17B illustrate hierarchical structures for a base station according to embodiments of the present disclosure.
Figure 17B:
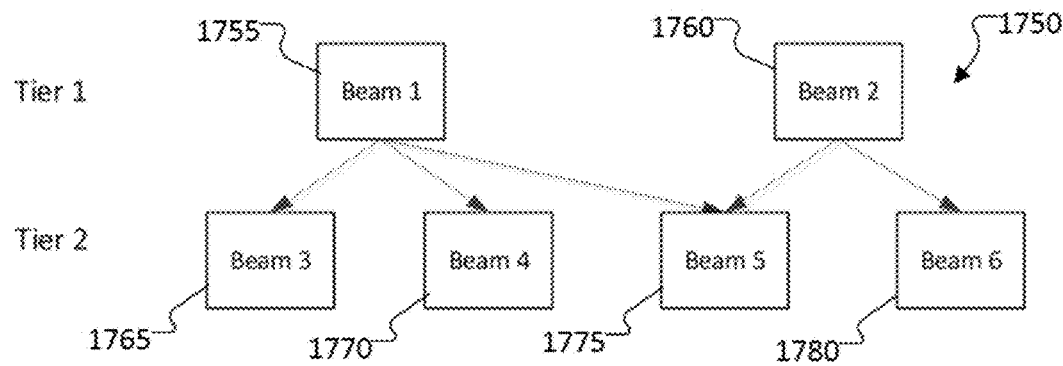

FIGS. 17A and 17B illustrate hierarchical structures for a base station according to embodiments of the present disclosure. The embodiments of the hierarchical structures 1700, 1750 shown in FIGS. 17A and 17B are for illustration only. Other embodiments could be used without departing from the scope of the present disclosure.

In the example hierarchical structure 1700 shown in FIG. 17A, gNB 102 has two wide beams and four narrow beams. That is, gNB 102 has a first wide beam (beam 1) 1705, a second wide beam (beam 2) 1710, a first narrow beam (beam 3) 1715, a second narrow beam (beam 4) 1720, a third narrow beam (beam 5) 1725, and a fourth narrow beam (beam 6) 1730. Additionally, in the example hierarchical structure 1750 shown in FIG. 17B, gNB 103 has two wide beams and four narrow beams. That is, gNB 102 has a first wide beam (beam 1) 1755, a second wide beam (beam 2) 1760, a first narrow beam (beam 3) 1765, a second narrow beam (beam 4) 1770, a third narrow beam (beam 5) 1775, and a fourth narrow beam (beam 6) 1780. In the examples illustrated, Beams 1 and 2 can represent wide beams while Beams 3, 4, 5, and 6 can represent narrow beams.

In the hierarchical structure 1700, Beam 4 1720 is child beam of Beam 2 1710 in gNB 102, while Beam 4 1770 is child beam of Beam 2 1760 in gNB 103. Moreover, Beam 5 1725 is not a child beam of Beam 1 1705 in gNB 102; however, Beam 5 1775 is a child of Beam 1 1755 in gNB 103.

In certain embodiments, the base station codebooks are configured to minimize UE handover between beams. For example, the codebook for gNB102 can be configured to serve UE 116 with Beam 4 1720 to minimize handover between Beam 1 1705 and Beam 2 1710.

In certain embodiments, the hierarchical codebook generation, as well as the hierarchical structure, are both site-specific. The codebooks are first generated based on the ray-tracing data. Next determine the best WB and NB index for each simulated location to generate the site-specific hierarchical structure.

Adaptation of the Codebook for UE Distribution, Deployment Environment, and UE Mobility Pattern The UE distribution could change with time, for example, during the work time and lunch time, the UE distribution within a cell could change a lot. For another example, during the night, the network traffic in the residential area could be much higher than the daytime.

In certain embodiments, UE distribution in the coverage varies over time and the codebook is designed to adapt to the changing dynamically. In one approach, gNB 102 can design several different codebooks: one for a different UE distribution, and dynamically select the codebook based on the current UE distribution.

In certain embodiments, the UE distribution is the prior information or can be estimated. There could be different approaches to estimate the UE distribution.

In one example approach, UE distribution is estimated based on the UE reports of their locations. The gNB 102 can request all the UEs, or a subset of the UEs, which are randomly picked, to report the current GPS coordinates for once, or the GPS coordinate periodically. The gNB 102 can save the all the UE reports in a memory and analyze the pattern of UE distribution.

In another example approach, UE distribution is estimated based on the UE reports, including the RSRP/RSRQ, and so forth. In one example, UE 116 reports the best beam index and the RSRP values to gNB 102. Based on the information reported by UE 116, gNB 102 can estimate the UE distribution and dynamically adapt the codebook.

Figure 18:
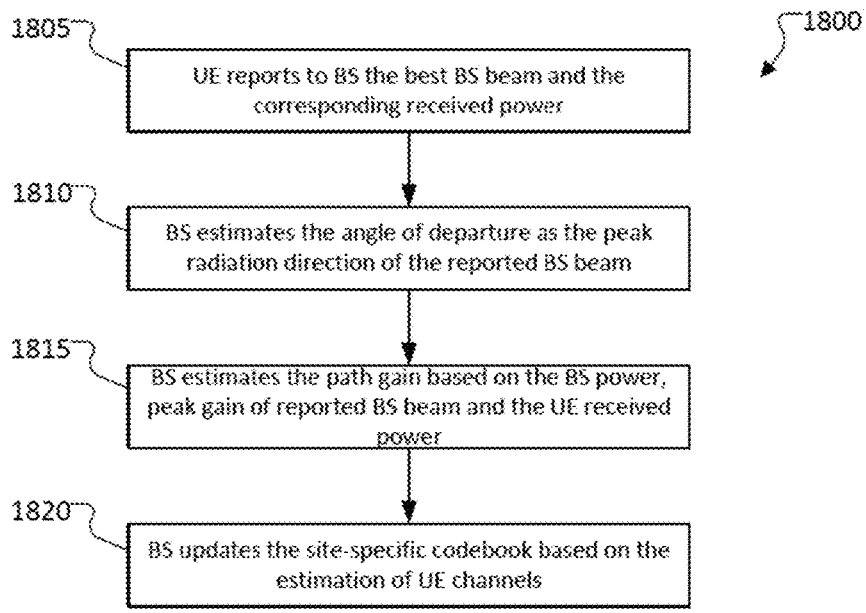
FIG. 18 illustrates a process for site-specific codebook update based on the UE reports according to embodiments of the present disclosure.

FIG. 18 illustrates a process for site-specific codebook update based on the UE reports according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1800 can be accomplished by, for example, gNB 102 and gNB 103 in network 100.

In operation 1805, gNB 102 receives reports from UE 116. The UE 116 reports to gNB 102 the best BS beam and the corresponding received power. The reports could be the L1-RSRP reports defined in 5G standard. In operation 1810, gNB 102 estimates the angle of departure of the dominating propagation path from BS to UE based on the reported best beam index. The peak radiation direction of the BS beam is a good estimate of the angle of departure, such as:

$$(\hat{\theta}_k, \hat{\phi}_k) = \mathrm{argmax}_{\theta, \phi} G_{n_k}(\theta, \phi) \quad (14)$$

In Equation 14, $G_{n_k}(\theta, \phi)$ is the radiation pattern of the BS beam $n_k$ which the best beam reported by the $k^{th}$ UE. From the reported received power, in operation 1815, gNB 102 can estimate the path gain (note that path gain is the opposite number of path loss). An estimator of the path gain is:

$$\hat{P}_k = c * \mathrm{RSRP}_{n_k} - P_{BS} - G_{n_k}(\hat{\theta}_k, \hat{\phi}_k) \quad (15)$$

In Equation 15, $P_{BS}$ is the transmit power of the BS, and $\mathrm{RSRP}_{n_k}$ is the RSRP value reported by user k about the BS beam $n_k$. Note that the RSRP is defined as the linear average over the power contributions of the resource elements that carry secondary synchronization signals (SS) according to TS 38.215, thus c is a coefficient to account for the bandwidth difference of resource element and the downlink data channel. As the angle and the path gain of the ray is estimated, the site-specific codebook design method given above can be used to update the codebook in operation 1820, by assuming that there is single ray in the channel. In certain embodiments, if UE reports RSRP of more than one beam, more complicated channel estimation method can be adopted.

In another embodiment, the UE reports the TA (Timing advance) value besides the best beam and received power, and the BS can estimate the equivalent lowpass channel as:

$$\hat{h}_k(\tau) = \hat{P}_k v(\hat{\theta}_k, \hat{\phi}_k) \text{Exp}(-j2\pi f_c \hat{\tau}_k) \delta(\tau - \hat{\tau}_k) \quad (16)$$

In Equation 16, $\hat{P}_k$ is the estimated path gain, $(\hat{\theta}_k, \hat{\phi}_k)$ is the estimated angle of arrival, $\hat{\tau}_k$ is the estimated time of arrival based on the TA value, and $v(\cdot)$ is the steering vector of gNB 102.

Once the codebook is updated in operation 1820, gNB 102 transmits control/data over the channel (e.g., SSB, PDCCH, PDSCH, etc.) using the updated BS beam codebook. UE 116 receives the control/data and reports L1-RSRP back to gNB 102. The gNB 102 can then update the beam codebook again in operation 1820.

Besides the temporal variation of the UE distribution, the deployment environment of gNB 102 could also change, although less frequently. For example, a new building can be constructed in the coverage of the cell, which will result in signal blockage. In certain embodiments, the codebook is designed to adapt to the change of deployment environment.

In one example approach, the adaptation of deployment environment is done by updating the ray-tracing data. Since the environment change happens less frequently, the cost of updating the ray-tracing data is affordable in most cases.

In another example approach, the adaption of deployment environment is done implicitly by adapting to the UE channel distribution. If a building is constructed in the cell, the BS beam pointing to the building may reach more UEs if there are lots of users living or working in the building, and thus will be reported more frequently by UEs as the best beam. Therefore, when UE 116 adapts the codebook to the UE distribution, UE 116 implicitly adapts to the environment change as well. In another case, if there is a new blockage (for example, a fence or a wall), erected in the cell, the UEs behind the blockage may report the same best beam index as before but with a much smaller RSRP. The site-specific codebook, which is updated by the iterative algorithm shown in Process 800 in FIG. 8, therefore could generate multiple narrow beams with higher gain in this direction to serve the blocked UEs.

The UE mobility pattern could also change with time. For example, a new road may be constructed. In another example, road work may be occurring requiring a detour. The UE mobility pattern changes temporarily during the road work.

In certain embodiments, the codebook is designed to adapt to the change of UE mobility pattern. The UE mobility pattern can be extracted from the history of UE reports. For example, as the UE moves, the sequence of reported best beam index could be [NB2, NB2, NB7, NB7, NB6, NB4, NB4, . . . ]. The gNB 102 can determine the dominating beam change pattern from the saved UE reports by various methods. The Markov chain modelling and the RNN modelling, described above with respect to FIG. 13, are two possible methods.

Figure 19:
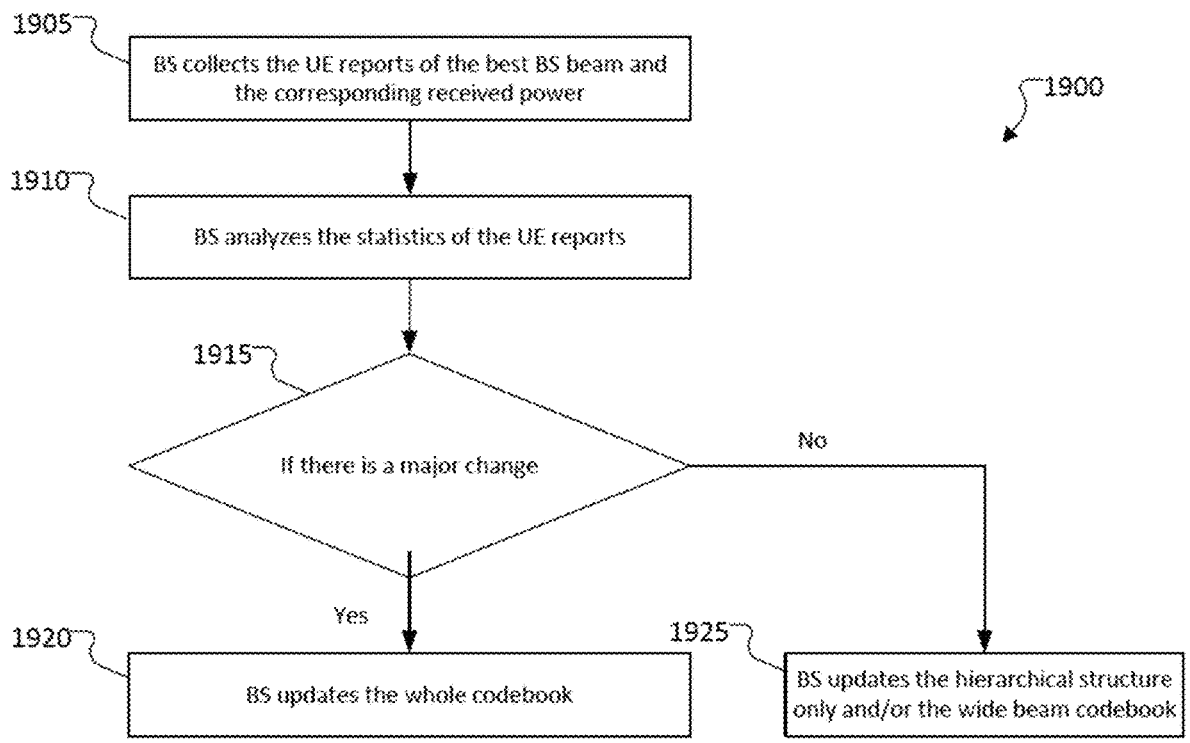
FIG. 19 illustrates a process for determining to update a codebook according to embodiments of the present disclosure.
Figure 20:
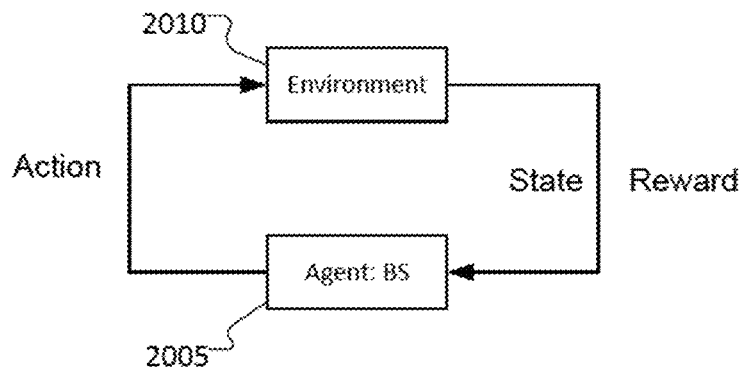
FIG. 20 illustrates a reinforcement learning framework according to embodiments of the present disclosure.

FIG. 19 illustrates a process for determining to update a codebook according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 1900 can be accomplished by, for example, gNB 102 and gNB 103 in network 100.

In certain embodiments, for a hierarchical codebook, gNB 102 chooses to update the hierarchical structure and/or the WB codebook as a low-cost and low-risk solution to adapt to minor UE distribution and/or UE mobility pattern and/or environment change, and chooses to regenerate the entire codebook, which is a solution with relatively higher cost and risk, if there is a major change of UE distribution and/or UE mobility pattern and/or deployment environment detected. In operation 1905, gNB 102 collects UE reports of the best beam and a corresponding received power. In operation 1910, gNB 102 analyzes the statistics of the UE reports. In operation 1915, gNB 102 determines whether there is a minor or major change. The classification of minor or major change can be determined according to the UE reports, for example, by checking the histogram of best beam index and the received power. If there is a significant change on the compiled UE reports, a major change is determined, and the hierarchical codebook is regenerated in operation 1920. Otherwise in operation 1925, if there is not a significant change, gNB 102 only updates the hierarchical structure and/or the WB codebook to adapt to the minor change. In certain embodiments, a neural network is trained to optimize the BS behavior. For example, a reinforcement learning framework shown in FIG. 20 can be adopted, where gNB 102 is the agent 2005, the agent action on the environment 2010 is the BS behavior, for example, update the hierarchical structure, or update the entire codebook, the state is the UE reports, and the reward is the average RSRP reported by UE 116.

Multi-Cell BS Beam Codebook

Figure 21:
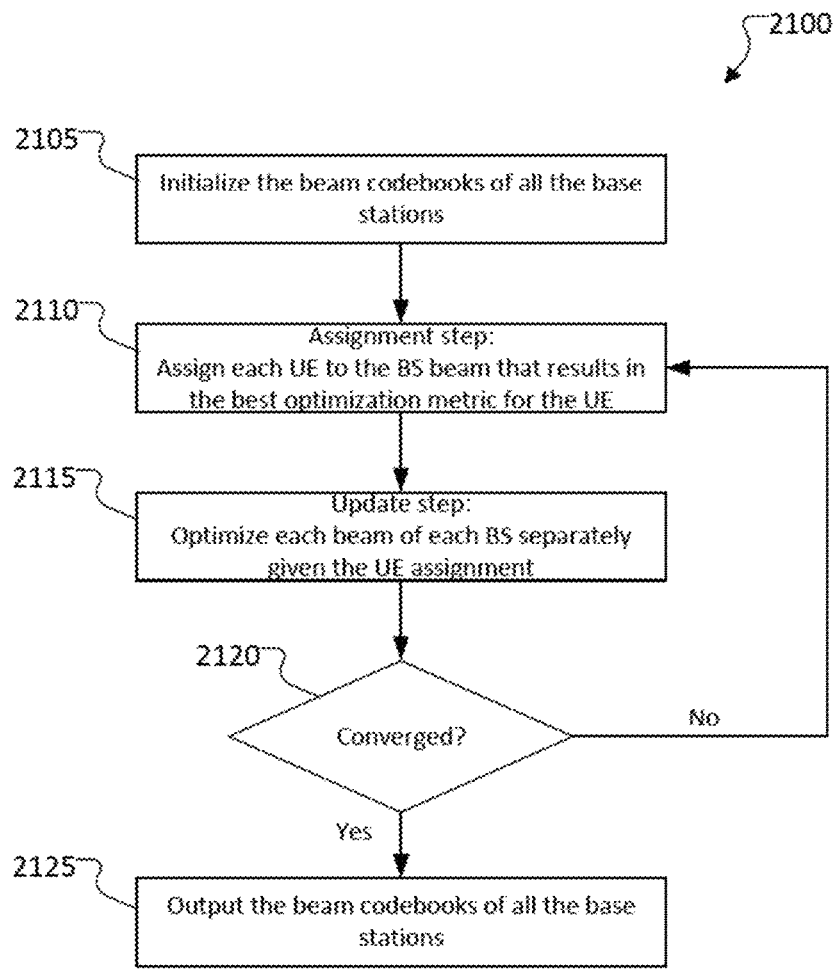
FIG. 21 illustrates a process for joint design of multiple beam codebooks according to embodiments of the present disclosure.

FIG. 21 illustrates a process for joint design of multiple beam codebooks according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 2100 can be accomplished by, for example, gNB 102 and gNB 103 in network 100.

In certain embodiments, beam codebooks of multiple BS are jointly designed based on the ray-tracing data and an iterative algorithm. The ray tracing data between each BS and each UE as follows.

1. $P_{j,k,l}$: ray gain
2. $\theta_{j,k,l}$: Elevation angle of departure from BS,
3. $\phi_{j,k,l}$: Azimuth angle of departure from BS, where $j(1 \leq j \leq J)$ is the BS index, $\ell$ $(1 \leq \ell \leq L)$ represents the $\ell$-th strongest path and $k(1 \leq k \leq K)$ stands for the index of UE.

The coupling gain of UE k can be computed by maximizing over the J base states and N beams per base station.

$$\gamma_{j,k,n} = w^*_{j,n} \left( \sum_{\ell=1}^{L} P_{j,k,\ell} M(\theta_{j,k,\ell}, \phi_{j,k,\ell}) \right) w_{j,n} \quad (17)$$

where $w_{j,n}$ is the n-th beam of BS j.

In operation 2105, gNB 102 first initializes all the J*N beams. Then, gNB 102 iterates between the assignment step in operation 2110 and the update step in operation 2115. The UE is assigned to one of the J*N beams in the assignment step, and the beam is optimized in the update step. For example, gNB 102 determines whether convergence has occurred in operation 2120. If convergence has not occurred, the process returns to operation 2110. That is, the assignment in operation 2110 and update in operation 2115 are updated iteratively until convergence; for example, the wide beams do not change, or the assignment of UE sets of the wide beams do not change any more. The optimization metric in the assignment in operation 2110 could be the coupling gain, the received power, or the throughput, and the like. Thereafter, the BS beam codebook for all of the base stations is output in operation 2125.

In one approach, the beam update step is based at least partly on the interference to the non-associated UE. For example, the beam is optimized to enlarge the gap between the coupling gain sum of the associated UEs of the given beam and the coupling gain sum of the other UEs.

In certain embodiments, UE 116 on the cell edges could be assigned to two or multiple BS beams from the neighboring BSs. This dual-assignment or multi-assignment result in the overlap between beams of different cells at the boundaries and could facilitate the cell handover.

In certain embodiments, the UE distribution, UE mobility pattern, and/or deployment environment across cells could change with time, and the UE distribution, UE mobility pattern, and/or deployment environment is taken into account in the multi-cell codebook generation.

BS Beam Codebook Design for LOS Ground UE

In certain embodiments, the BS beam codebook is designed to serve the LOS UE on the ground.

In one approach, the method based on ray-tracing simulation could be used. First, drop the UE on the ground uniformly within the coverage area of the BS. Second, obtain the ray-tracing data. Since there is only one LOS (line-of-site) path between BS and UE, the ray-tracing simulation tool only outputs single ray information for every BS-UE pair.

In another approach, the free-space channel propagation model is used. The angle of departure can be computed based on the coordinates of the BS and UE, and the path-loss can be computed based on the distance. For example, the Friis transmission formula could be used to compute the path-loss:

$$PL = \left(\frac{c}{4\pi d f}\right)^2$$

where f is the carrier frequency, d is the BS-UE distance, and c is the speed of light.

The designed beam codebook is not site-specific, since it ignores the buildings/trees and thus blockage/reflection/scattering. However, it does depend on the geometric setup of the BS and UE, for example, the BS height, UE height/locations, etc.

Electrical Tilting

Figure 22:
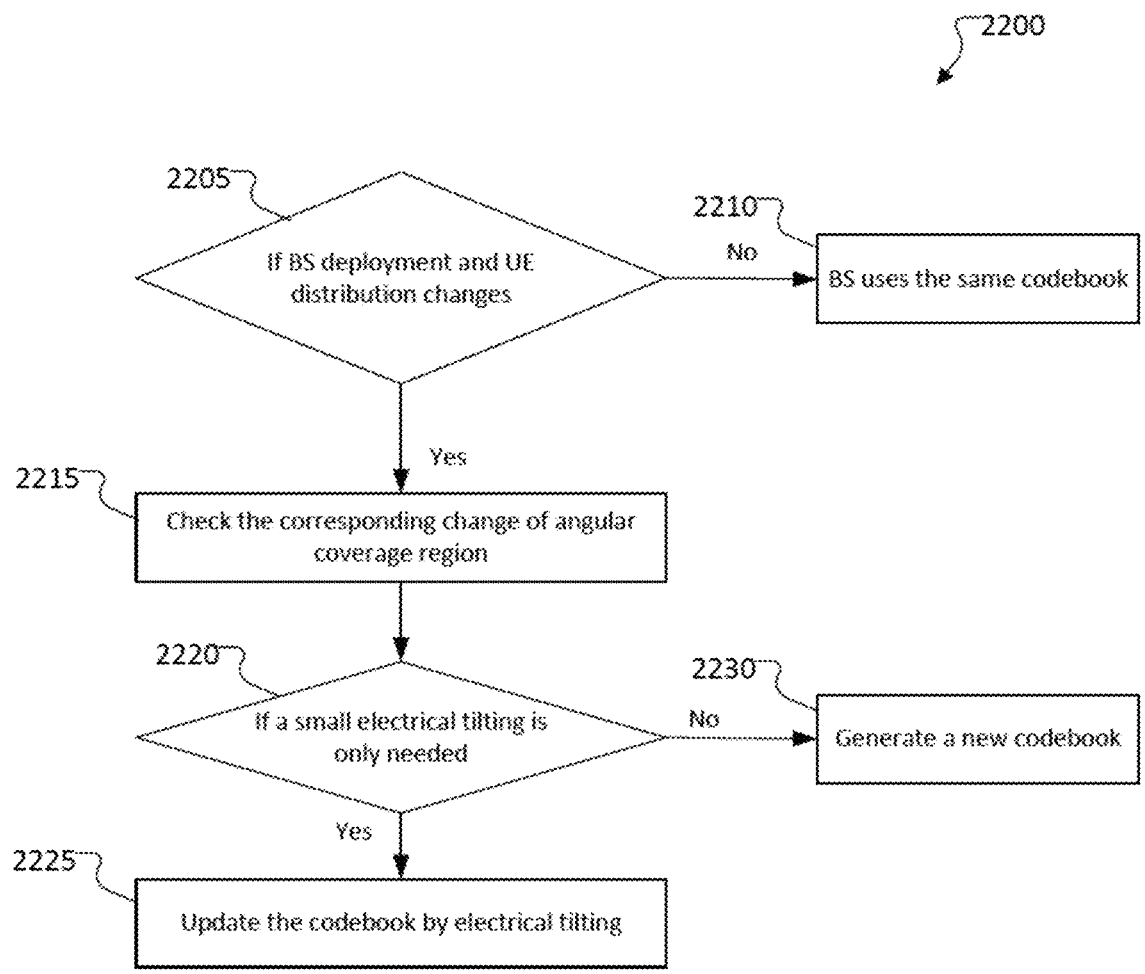
FIG. 22 illustrates a process for updating codebooks by electrical tilting according to embodiments of the present disclosure.

FIG. 22 illustrates a process for updating codebooks by electrical tilting according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by processing circuitry in, for example, a gNB. Process 2200 can be accomplished by, for example, gNB 102 and gNB 103 in network 100.

In the field deployment of the base station, the mechanic tilting angle of the base station, the BS height and the cell size could be different from our ray-tracing scenario. For example, if the BS is mounted at a height higher than that assumed in the codebook, then the electrical downtilting is needed.

In certain embodiments, a given codebook could support electrical tilting by elementwise multiplying the codewords with an angle-shift vector. The angle-shift vector is defined as:

$$\begin{bmatrix} x_1 & y_1 & z_1 \\ x_2 & y_2 & z_2 \\ \cdots & \cdots & \cdots \\ x_q & y_q & z_q \end{bmatrix} \begin{bmatrix} \sin\theta \\ 0 \\ \cos\theta \end{bmatrix}, \quad (18)$$

where $[x_i, y_i, z_i]$ is the coordinate of the i-th antenna element and $\theta$ is the electrical tilting angle.

In operation 2205, gNB 102 determines whether a BS deployment or UE distribution changes. If there is no change in BS deployment or UE distribution, gNB 102 uses the same codebook in operation 2210. In certain embodiments, the electrical tilting is used to adapt the codebook to minor change of deployment. Electrical tilting may be first option of codebook adaptation, if the environment or UE distribution changes but not too much. The benefit can be less interruption to connected UEs.

In operation 2215, gNB 102 checks a change of angular coverage region. In certain embodiments, the change of deployment environment or UE distribution is minor if the required titling angle is less than a threshold. Therefore, in operation 2220, gNB 102 determines whether only a small electrical tilting is required. For example, if the tilting angle is between −10° and 10°, the electrical titling technique could be used without regenerating the codebook in operation 2225. In operation 2225, the codebook is updated by electrical tilting.

In operation 2230, the codebook regeneration is triggered if the deployment environment or UE distribution changes too much. If the new codebook results in different structure, the disruption is more, such as, the RRC reconfiguration needs to occur, or the broadcast control needs to change.

In certain embodiments, if BS mechanical titling angle can be adjusted remotely by the operator, the mechanical tilting angle, instead of the electrical tilting angle, could be adjusted in the above embodiment. Alternatively, both the mechanical tilting angle, and electrical tiling angle are jointly adjusted to adapt the change of deployment environment or UE distribution.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope.

What is claimed is:

1. An apparatus comprising:
an antenna;
a transceiver coupled to the antenna and configured to communicate via a wireless communication medium; and
a processor coupled to the transceiver and configured to:
receive, from a user equipment (UE), a measurement report comprising a best beam index and a corresponding received power;
estimate an angle of departure as a peak gain direction of a best beam corresponding to the best beam index;
estimate a path gain based on a base station (BS) transmission power, the received power, and a BS beam pattern, wherein the BS beam pattern is based on at least one of wideband beams or narrowband beams;
estimate a UE channel including the path gain and the angle of departure;
update a site-specific codebook based on the estimated UE channel; and
transmit control and data signals to the UE using the updated site-specific codebook.

2. The apparatus of claim 1, wherein the processor is configured to adapt a beam codebook to a UE distribution, deployment environment, or UE mobility pattern.

3. The apparatus of claim 1, wherein the processor is configured to:
determine if a major change in one or more statistics of the measurement report occurs; and
update at least one of a hierarchical structure or a wideband beam (WB) codebook if there is no major change, and
regenerate an entirety of the WB codebook if there is a major change.

4. The apparatus of claim 1, wherein the processor is configured to:
extract a UE mobility pattern from a history of UE reports;
model the UE mobility pattern using a Markov chain; and
assign narrow beams with a high transition probability to a same parent beam.

5. The apparatus of claim 1, wherein the processor is configured to:
check a UE distribution over one or more angular domains; and
adjust an electrical tilting angle accordingly.

6. The apparatus of claim 1, wherein the processor is configured to:
extract channel information including a path gain and an angle of departure from a ray-tracing simulation; and
design the site-specific codebook to maximize an average coupling gain or throughput.

7. The apparatus of claim 1, wherein the processor is configured to:
design a site-specific narrow beam codebook; and
after designing the site-specific narrow beam codebook, design a site-specific wide beam codebook by merging one or more UE sets covered by one or more narrow beams.

8. The apparatus of claim 1, wherein the processor is configured to:
identify a pair of best narrowband (NB) beams and best wideband (WB) beams for each UE based on ray-tracing data; and
determine a site-specific hierarchical structure by connecting a WB beam and a NB beam that are paired a plurality of times.

9. The apparatus of claim 1, wherein the processor is configured to design a site-specific wide beam codebook based at least partly on a UE mobility pattern,
wherein the UE mobility pattern is obtained through a simulation of UE movement.

10. A method comprising:
receiving, from a user equipment (UE), a measurement report comprising a best beam index and a corresponding received power;
estimating an angle of departure as a peak gain direction of a best beam corresponding to the best beam index;
estimating a path gain based on a base station (BS) transmission power, the received power, and a BS beam pattern, wherein the BS beam pattern is based on at least one of wideband beams or narrowband beams;
estimating a UE channel including the path gain and the angle of departure;
updating a site-specific codebook based on the estimated UE channel; and
transmitting control and data signals to the UE using the updated site-specific codebook.

11. The method of claim 10, further comprising:
adapting a beam codebook to a UE distribution, deployment environment, or UE mobility pattern.

12. The method of claim 10, further comprising:
determining if a major change in one or more statistics of the measurement report occurs; and
updating at least one of a hierarchical structure or a wideband beam (WB) codebook if there is no major change, and
regenerating an entirety of the WB codebook if there is a major change.

13. The method of claim 10, further comprising:
extracting a UE mobility pattern from a history of UE reports;
modeling the UE mobility pattern using a Markov chain; and
assigning narrow beams with a high transition probability to a same parent beam.

14. The method of claim 10, further comprising:
checking a UE distribution over one or more angular domains; and
adjusting an electrical tilting angle accordingly.

15. The method of claim 10, further comprising:
extracting channel information including a path gain and an angle of departure from a ray-tracing simulation; and
designing the site-specific codebook to maximize an average coupling gain or throughput.

16. The method of claim 10, further comprising:
designing a site-specific narrow beam codebook; and
after designing the site-specific narrow beam codebook, designing a site-specific wide beam codebook by merging one or more UE sets covered by one or more narrow beams.

17. The method of claim 10, further comprising:
identifying a pair of best narrowband (NB) beams and best wideband (WB) beams for each UE based on ray-tracing data; and
determining a site-specific hierarchical structure by connecting a WB beam and a NB beam that are paired a plurality of times.

18. The method of claim 10, further comprising designing a site-specific wide beam codebook based at least partly on a UE mobility pattern,
  wherein the UE mobility pattern is obtained through a simulation of UE movement.

* * * * *